US012576662B2

(12) United States Patent
Harrison et al.

(10) Patent No.: US 12,576,662 B2
(45) Date of Patent: Mar. 17, 2026

(54) THERMOGRAPHIC IMAGING ELEMENT

(71) Applicants: Daniel Jude Harrison, Pittsford, NY (US); Jennifer Lynn Eskra, Lockport, NY (US); John Richard Przybylo, Amherst, NY (US)

(72) Inventors: Daniel Jude Harrison, Pittsford, NY (US); Jennifer Lynn Eskra, Lockport, NY (US); John Richard Przybylo, Amherst, NY (US)

(73) Assignee: International Imaging Materials, Inc., Amherst, NY (US)

( * ) Notice: Subject to any disclaimer, the term of this patent is extended or adjusted under 35 U.S.C. 154(b) by 133 days.

(21) Appl. No.: 18/375,721

(22) Filed: Oct. 2, 2023

(65) Prior Publication Data

US 2024/0094619 A1 Mar. 21, 2024

Related U.S. Application Data

(63) Continuation of application No. PCT/US2022/034174, filed on Jun. 20, 2022.

(60) Provisional application No. 63/213,818, filed on Jun. 23, 2021.

(51) Int. Cl.
*B41M 5/36* (2006.01)
*B41M 5/42* (2006.01)

(52) U.S. Cl.
CPC ................ *B41M 5/36* (2013.01); *B41M 5/42* (2013.01); *B41M 2205/04* (2013.01); *B41M 2205/38* (2013.01)

(58) Field of Classification Search
CPC ........ B41M 5/36; B41M 5/361; B41M 5/363; B41M 5/366; B41M 5/42; B41M 2205/04; B41M 2205/38
See application file for complete search history.

(56) References Cited

U.S. PATENT DOCUMENTS

2014/0154498 A1* 6/2014 Lockhart ............... B32B 27/205 264/293
2019/0054214 A1* 2/2019 Hermel-Davidock ....................... A61L 31/041

* cited by examiner

*Primary Examiner* — Gerard Higgins
(74) *Attorney, Agent, or Firm* — Michael J. Nickerson

(57) ABSTRACT

A thermographic substrate assembly includes a colorant and a flexible substrate. This assembly also contains a thermosensitive layer, and the thermosensitive layer contains an elastomeric binder and a multiplicity of voids.

13 Claims, 9 Drawing Sheets

1000

TABLE 1

| Example # | Thermosensitive Foam Binder | Binder Tg (°C) | Wet Foam Thickness (mm) | Thermal Solvent | Log P of Thermal Solvent | Thermal Solvent Layer g/m² | Substrate | L* White | L* Black | Scratch (1 - 5) |
|---|---|---|---|---|---|---|---|---|---|---|
| 1 | Impranil DLH | -37 | 0.3 | --- | --- | --- | BOPP | 63.9 | 17.8 | 5 |
| 2 | Impranil DLH | -37 | 0.3 | KS232 | 4.3 | 1.7 | BOPP | 80.9 | 14.8 | 5 |
| 3 | Impranil DLH | -37 | 0.3 | KS232 | 4.3 | 2.6 | BOPP | 81.2 | 14.1 | 5 |
| 4 | Impranil DLH | -37 | 0.3 | KS232 | 4.3 | 4.3 | BOPP | 84.8 | 13.8 | 5 |
| 5 | --- | | --- | KS232 | 4.3 | 4.3 | BOPP | 77.4 | 11.8 | 5 |
| 6 | Impranil DLH | -37 | 0.3 | KS232 | 4.3 | (in foam) | BOPP | 66.2 | 11.9 | 4 |
| 7 | Impranil DLU | -67 | 0.3 | KS232 | 4.3 | 4.3 | BOPP | 89 | 17 | 5 |

Figure 6

TABLE 2

| Example # | Thermosensitive Foam Binder | Wet Foam Thickness (mm) | Thermal Solvent | Log P of Thermal Solvent | Thermal Solvent Layer g/m$^2$ | Substrate | L* White | L* Black | Scratch (1 - 5) |
|---|---|---|---|---|---|---|---|---|---|
| 8 | HPB4020 | 0.3 | --- | --- | --- | BOPP | 72.8 | 6.7 | 1 |
| 9 | HPB4020 | 0.3 | KS232 | 4.3 | 4.3 | BOPP | 83.9 | 12.2 | 3 |
| 10 | HPB4020 | | KS232 | 4.3 | 4.3 | BOPP | 75.9 | 8.2 | 1 |
| 11 | HPB4020 | 0.4 | --- | --- | --- | BOPP | 77.1 | 8.8 | 1 |
| 12 | HPB4020 | 0.5 | --- | --- | --- | BOPP | 82.2 | 12.8 | 1 |
| 13 | HPB4020 | | --- | --- | --- | BOPP | 8 | 6.4 | n/a |

Figure 7

TABLE 3

| Example # | Thermosensitive Foam Binder | Binder Tg (°C) | Wet Foam Thickness (mm) | Thermal Solvent | Log P of Thermal Solvent | Thermal Solvent Layer g/m² | Substrate | L* White | L* Black | Scratch (1 - 5) |
|---|---|---|---|---|---|---|---|---|---|---|
| 14 | DLU | -67 | 0.3 | --- | --- | --- | Paper | 84.8 | 40.9 | 4 |
| 15 | DLU | -67 | 0.3 | GTB | 1.52 | in foam | Paper | 79.5 | 27.4 | 2 |
| 16 | DLU | -67 | 0.3 | MDMB | 2.06 | in foam | Paper | 87.7 | 54.9 | 3 |
| 17 | DLU | -67 | 0.3 | DPS | 2.06 | in foam | Paper | 90.8 | 75.3 | 1 |
| 18 | DLU | -67 | 0.3 | MBB | 2.7 | in foam | Paper | 86.2 | 41.6 | 3 |
| 19 | DLU | -67 | 0.3 | MBO | 3.09 | in foam | Paper | 76.4 | 10.8 | 2 |
| 20 | DLU | -67 | 0.3 | DBO | 3.4 | in foam | Paper | 84 | 17.8 | 3 |
| 21 | DLU | -67 | 0.3 | BCO | 3.78 | in foam | Paper | 86 | 28.6 | 3 |
| 22 | DLU | -67 | 0.3 | KS235 | 3.8 | in foam | Paper | 83.1 | 7.8 | 3 |
| 23 | DLU | -67 | 0.3 | KS232 | 4.3 | in foam | Paper | 85.7 | 7.9 | 4 |
| 24 | DLU | -67 | 0.3 | Uniplex 512 | 4.5 | in foam | Paper | 81.8 | 25.1 | 1 |
| 25 | DLU | -67 | 0.3 | BNE | 5.02 | in foam | Paper | 86 | 27.9 | 3 |

Figure 8

TABLE 4

| Example # | Thermosensitive Foam Binder | Binder Tg (°C) | Wet Foam Thickness (mm) | Thermal Solvent | Log P of Thermal Solvent | Thermal Solvent Layer g/m² | Substrate | L* White | L* Black | Scratch (1 - 5) |
|---|---|---|---|---|---|---|---|---|---|---|
| 26 | DLH | -37 | 0.3 | --- | --- | --- | Paper | 58.4 | 14.6 | 5 |
| 27 | DLH | -37 | 0.3 | MBO | 2.7 | 3.3 | Paper | 80 | 12.6 | 5 |
| 28 | DLH/J633 | | 0.3 | MBO | 2.7 | 3.3 | Paper | 87.3 | 7.6 | 4.5 |
| 29 | DLH/J633 | | 0.3 | MBO | 2.7 | 3.3 | Paper | 89.4 | 10.7 | 3.5 |
| 30 | DLH/J633 | | 0.3 | MBO | 2.7 | 3.3 | Paper | 90.4 | 13.6 | 3.5 |
| 31 | J633 | 104 | 0.3 | MBO | 2.7 | 3.3 | Paper | 92.8 | 44.9 | 2 |
| 32 | J633 | 104 | 0.3 | --- | --- | --- | Paper | 87.7 | 23.5 | 2 |

Figure 9

THERMOGRAPHIC IMAGING ELEMENT

PRIORITY INFORMATION

The present application is a continuation application of PCT Patent Application Number PCT/US2022/034174, filed on Jun. 20, 2022, and claims priority, under 35 U.S. PCT/US2022/034174, filed on Jun. 20, 2022/US2019/061898, filed on Nov. 17, 2019. The entire content of PCT Patent Application Number PCT/US2022/034174, filed on Jun. 20, 2022, is hereby incorporated by reference.

PCT Patent Application Number PCT/US2022/034174, filed on Jun. 20, 2022, claims priority, under 35 U.S.C. § 119(e), from U.S. Provisional Patent Application No. 63/213,818, filed on Jun. 23, 2021.

The present application claims priority, under 35 U.S.C. § 119(e), from U.S. Provisional Patent Application No. 63/213,818, filed on Jun. 23, 2021. The entire content of U.S. Provisional Patent Application No. 63/213,818, filed on Jun. 23, 2021, is hereby incorporated by reference.

BACKGROUND

Direct thermal imaging is widely used for printing variable information; for example, this imaging method is commonly used to print receipts, shipping address labels, barcodes, airline boarding passes, and the like. Direct thermal imaging or printing is accomplished by directing heat to specific regions of thermosensitive substrate resulting in a change in the color of the region which was heated. Image-wise heating of the thermosensitive substrates is accomplished using a thermal printer such as, for example, the printers provided by Zebra Corporation.

Such printers contain thermal printheads comprised of linear arrays of individually addressable heating elements, typically containing 60 to 236 such heating elements per linear centimeter of printhead. The thermal printhead is placed in intimate contact with the thermosensitive substrate. As the substrate is caused to move beneath the printhead, the individual heating elements are caused to heat in an image-wise pattern, printing and imaging one complete line across the thermosensitive substrate at a time. Typical printing speeds range from 2.5 centimeters per second cm/s to 30 centimeters per second.

Direct thermal imaging substrates are coated with thermosensitive layers which contain leuco dyes, developers, and sensitizers. Leuco dyes are lactone-based molecules which change color with changes in pH. Leuco dyes are colorless in the unprinted thermosensitive layer. Developers are lewis acids and sensitizers are thermal solvents. Image wise heating melts the sensitizer which in turn solubilizes the Lewis acid developer which lowers the pH of the thermosensitive layer, causing the leuco dye to change from a colorless state to a colored state.

Direct thermal imaging has been widely accepted as a fast and efficient digital printing method. However, leuco dye based direct thermal substrates have a significant weakness, i.e., the stability of the printed image to fading from exposure to sunlight.

For example, U.S. Pat. No. 6,034,704 discloses that thermally activated substrates produce images which can be expected to fade. Labels, facsimiles, and receipts printed on direct thermal sensitive substrates will fade quickly if they are not stored in a dark environment. Many labeling applications require the printing of variable information onto substrates for outdoor usage and consequently require good resistance to fading induced by exposure to sunlight. The entire content of U.S. Pat. No. 6,034,704 is hereby incorporated by reference.

U.S. Pat. No. 8,536,087 discloses a non-leuco dye based thermographic substrate assembly comprised of a colorant layer coated on a flexible substrate, wherein the thermographic substrate assembly is further comprised of a thermosensitive layer covering the colorant layer, and wherein the thermosensitive layer is comprised of a binder, a multiplicity of hollow sphere organic pigments, and a thermal solvent. Hollow sphere organic pigments are white in color due to their ability to scatter visible light facilitated by their morphology. The entire content of U.S. Pat. No. 8,536,087 is hereby incorporated by reference.

U.S. Pat. No. 8,536,087 teaches that the propensity of leuco dye based thermographic substrates to fade in sunlight can be overcome by using fade resistant pigments in the colorant layer. The opacification layer employed in the '087 patent covers the colorant layer, providing a near white background color to this thermographic imaging substrate. Image-wise heat from the thermal printer causes a shift in the thermosensitive layer from opaque to transparent, revealing the underlying colorant layer where printed. This opacity shift is accomplished by the collapsing of the hollow sphere organic pigments contained in the thermosensitive layer during the thermal printing process and facilitated by the melting of the thermal solvent. However, the hollow sphere organic pigments may also be transparentized by the application of pressure. Such unwanted transparentization, as may occur when the thermographic imaging substrate is scratched of bumped, severely compromises the substrate's durability.

U.S. Pat. No. 4,427,836 describes multiple-stage core-sheath polymer dispersions comprised of micro-voids. These hollow spheres polymer particles have certain advantages as opacifying agents in aqueous coating solutions either as a supplement to, or replacement of, conventional inorganic pigments. However, these polymer particles have poor solvent resistance, limiting their use almost exclusively to aqueous systems. The entire content of U.S. Pat. No. 4,427,836 is hereby incorporated by reference.

Marketing literature on hollow organic pigments from Rohm and Haas warns to avoid using solvents and plasticizers with solubility parameters similar to the hollow sphere organic pigments in coating compositions. Such solvents can soften the polymer shell of the pigment, causing collapse of the spheres during film formation.

U.S. Pat. Nos. 8,054,323 and 10,427,440 disclose a thermographic substrate comprised of an opaque polymer layer covering a color layer. Heat and pressure applied to the opaque polymer layer causes it to transparentize, revealing the underlying color layer. The entire contents of U.S. Pat. Nos. 8,054,323 and 10,427,440 are hereby incorporated by reference.

Opaque polymers, such as styrene-acrylic copolymers disclosed in U.S. Pat. No. 8,054,323 are transparentizable with heat and pressure. However, the heat and pressure available to do so in a thermal printer is very limited. To achieve high opacity and covering power over a colored layer, a high deposition of opaque polymer is required, and such high depositions are difficult to transparentize with a thermal printer.

U.S. Pat. No. 8,054,323 discloses the addition of opacifiers such as titanium dioxide pigments to the opaque polymer layer to improve its opacity. Indeed, the addition of such opacifiers greatly improves the opacity of the opaque polymer layer. However, such pigments are not transparentizable with the heat and pressure of a thermal printer and greatly reduce the ability of the layer to transparentize. Such transparentization is necessary to cause a useful change in color contrast which is required for robust printing of human and machine readable text and barcodes.

Published United States Patent Application 2008/0254397 discloses a process for transparentizing a non-transparent microvoided biaxially stretched, self-supporting polymeric film. The entire content of Published United States Patent Application 2008/0254397 is hereby incorporated by reference.

The transparentization process utilizes image wise application of heat, optionally supplemented by pressure. Microvoided films offer good opacity and covering power and do have thermographic imaging capabilities as disclosed in Published United States Patent Application 2008/0254397.

Microvoided polymer films based on low melting temperature polyolefinic resins such as polypropylene are easily transparentized with pressure and thus have poor resistance to damage from scratching or bumping. Microvoided films prepared from high melting point resins such as polyethylene terephthalate are more resistant to damage from scratching and bumping but require application of high amounts of thermal energy and pressure to transparentize.

Published United States Patent Application 2008/0254397 discloses the use of a heated soldering iron to affect such transparentization. Such amounts of thermal energy and pressure are difficult to achieve in thermal printers and thus the transparentization of high melting, microvoided polymers necessary to cause a useful change in color contrast required for robust printing of human and machine readable text and barcodes is unlikely to be achieved.

Thus, it is desirable to provide a thermographic substrate assembly that affords good resistance to fading induced by exposure to sunlight, good resistance to pressure induced transparentization from scratches and bumps and good thermographic sensitivity for imaging in thermal printers and high whiteness and brightness.

Elastomers are well known for having good mechanical recovery stresses such as stretching or compressing. In the following discussion, rubbers and elastomers are polymers, copolymers, and/or macromolecules with glass transitions below ambient temperature and high percent elongation to break. In contrast, thermoplastic polymers, copolymers, and/or macromolecules are materials with glass transitions and/or melting points above ambient temperature and typically have lower percent elongation to break. For the purpose of the instant invention, the term elastomer shall describe all polymers and copolymers, including natural and synthetic rubbers, with glass transitions below ambient temperature and elongation to break of at least about 100%. Elastomers shall also include all thermoplastic polymers which are plasticized such that their glass transitions are below ambient temperatures and elongation at break of at least about 100%.

Elastomers possess elastic properties which enable them to essentially recover to their original size and shape after being exposed to extensional or compressive stresses. However, on their own most elastomers are not very opaque. Filling elastomers with bubbles of gas or voids is known to those skilled in the art to create a soft, spongy material which quickly recovers from compression; i.e., foam rubber. As the fraction of gas bubbles or voids in an elastomer increases, so does its opacity and whiteness.

In a scientific study on the physical properties of foams such as shaving cream by D. Durian et al., which appeared in Physical Review A, 44(12), R7902-R7906, the authors found that the amount of light transmission through a thin layer of foam was proportional to the size of the bubbles in the foam. The amount of light which is transmitted through a layer of foam is a measure of its opacity. From this work it can be inferred that the smaller the average bubble size, the higher the opacity. Additionally, the higher the concentration of bubbles in a foam, the higher the opacity is.

Filling thermoplastic polymers with air bubbles also produces foams, which are soft and opaque; i.e., polystyrene foam. However, such foams lack the elasticity necessary to recover from compressive stress and are permanently deformed by scratching or bumping.

In the following disclosure, the term void describes all bubbles, holes, vesicles, cavities, blisters, gaps, cracks, etc., which may be formed within a solid substance.

It is further desired to provide a thermographic substrate assembly comprised of a colorant and a flexible substrate, wherein the thermographic substrate assembly is further comprised of a thermosensitive layer, and wherein the thermosensitive layer is an opaque substance which can be rendered transparent upon the application of heat and pressure.

BRIEF DESCRIPTION OF THE DRAWINGS

The drawings are only for purposes of illustrating various embodiments and are not to be construed as limiting, wherein:

FIGS. 6-9 show tables for the data for the disclosed examples.

DETAILED DESCRIPTION

Figure 1:
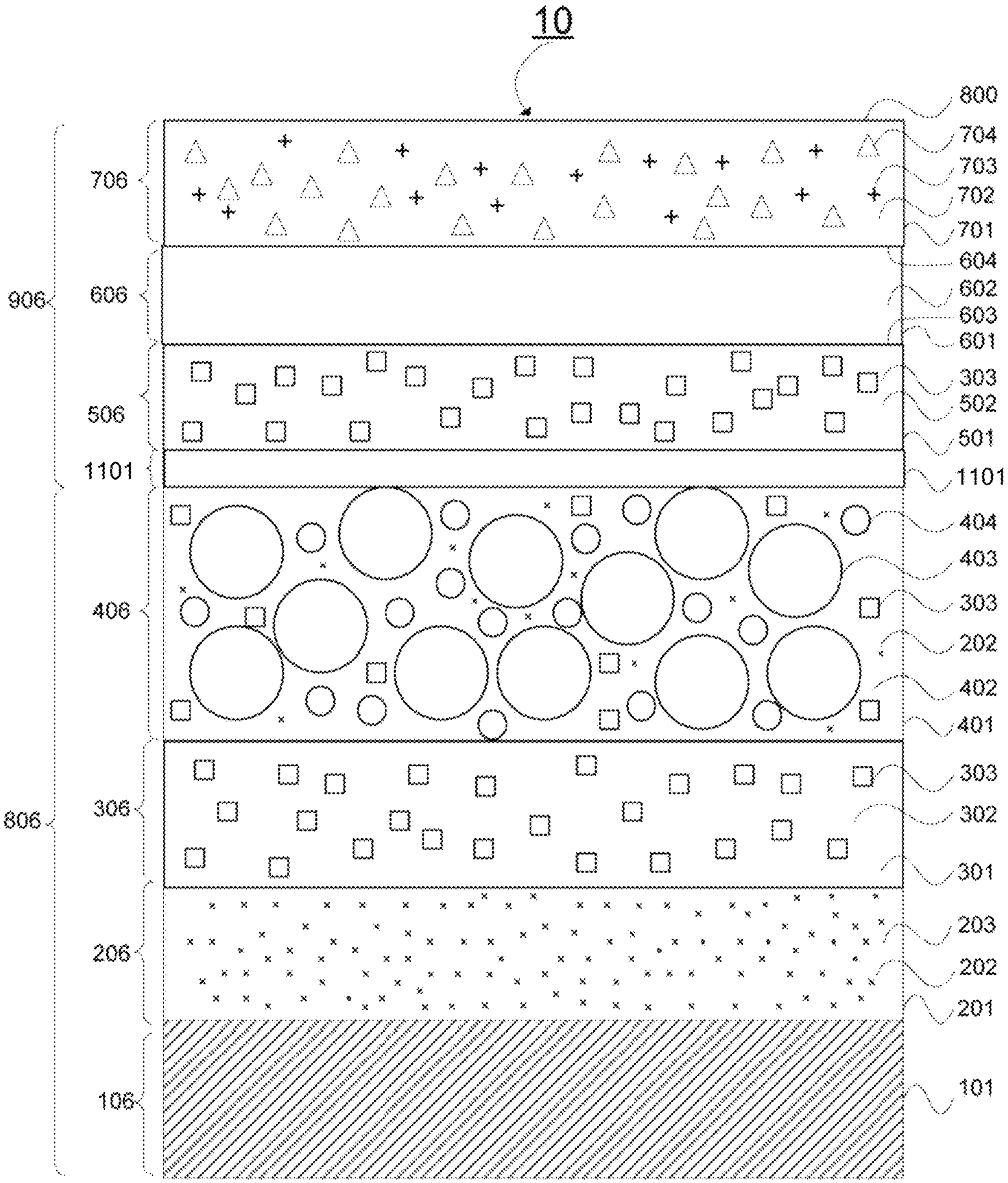
FIG. 1 is a schematic of a thermographic substrate.

For a general understanding, reference is made to the drawings. In the drawings, like references have been used throughout to designate identical or equivalent elements. It is also noted that the drawings may not have been drawn to scale and that certain regions may have been purposely drawn disproportionately so that the features and concepts could be properly illustrated.

In one embodiment, thermographic materials and, in particular, direct thermal imaging substrates capable of developing sufficient visual contrast are utilized such that human and machine readable images may be printed by direct heating of the substrates with a thermal printer and have sufficient image durability that they are suitable for both indoor and outdoor applications.

In one embodiment, voided elastomers are used in the thermographic imaging element of the invention.

In another embodiment, thermal solvent and voided elastomers are used in the thermographic imaging element of the invention.

In one embodiment, there are provided thermographic materials and, in particular, direct thermal imaging substrates capable of developing sufficient visual contrast such that human and machine readable images may be printed by direct heating of the substrates with a thermal printhead and have sufficient resistance to image fading that they are suitable for indoor and outdoor applications.

In an embodiment, thermal printing of thermographic substrates generates visual contrast using heat and pressure to alter the light scattering capability of the thermosensitive layers of the substrate such that white opaque layers become transparent, revealing underlying layers of high color saturation.

The thermographic materials of this embodiment are preferably comprised of thermosensitive layers applied to flexible substrates suitable for a variety of digital thermal printing applications such as receipts, tickets, labels, tags, bar codes, and the like. The thermosensitive layers are comprised of voided elastomers, whiteners, surfactants, viscosifiers, binders and optionally thermal solvents and/or colorants.

The thermal solvent is a solid substance with solubility characteristics preferable similar to those of the voided elastomer. Upon application of heat and pressure delivered from the thermal printing process to the thermosensitive layers a decrease in opacity of the thermosensitive layers is achieved, allowing the underlying color layer to show through.

In an embodiment, the heat and pressure delivered from the thermal printing process to the thermosensitive layers, results in melting of the thermal solvent which in-turn helps to facilitate a decrease in opacity of the thermosensitive layers, allowing the underlying color layer to show through.

This embodiment does not rely on leuco dye based thermographic chemistries which are prone to light fade. Additionally, this embodiment does not rely upon iron based thermographic chemistries which tend to gain background density upon exposure to light. This embodiment is able to utilize conventional color pigments, either in an underlying substrate or as a part of a thermosensitive layer.

Numerous colored pigments are known to those skilled in the art to be resistant to fading from exposure to light and in particular to sun light. This inherent advantage enables direct thermal printable substrates to be prepared which are suitable for outdoor applications.

In this embodiment, white opaque thermosensitive layers comprised of voided elastomers may be coated over colored substrates. Heat and pressure from a thermal printhead render the white opaque thermal sensitive layers to turn sufficiently transparent that the underlying colored substrate is revealed and sufficient visual contrast is developed between the heated and unheated portions of the substrate such that human and machine readable images can be read.

In an embodiment, white opaque thermosensitive layers are comprised of voided elastomers and thermal solvents coated over colored substrates. Heat and pressure from a thermal printhead render the white opaque thermal sensitive layer to turn sufficiently transparent that the underlying colored substrate is revealed and sufficient visual contrast is developed between the heated and unheated portions of the substrate such that human and machine readable images can be read.

In another embodiment, white opaque thermosensitive layers comprised of voided elastomer layers and thermal solvent layers are coated over colored substrates, both such layers contributing to the opacity and brightness of the thermographic substrate. Heat and pressure from a thermal printhead render the white opaque thermal sensitive layers to turn sufficiently transparent that the underlying colored substrate is revealed and sufficient visual contrast is developed between the heated and unheated portions of the substrate such that human and machine readable images can be read.

In another embodiment, the thermosensitive layers may additionally comprise pigments capable of absorbing light. Such thermal sensitive layers are opaque and low in color saturation when initially applied to a flexible substrate. However, upon heating with a thermal printhead such layers will become more transparent, enabling the colored pigment to impart color saturation to the layer. Such pigmented thermosensitive layers develop sufficient visual contrast between the heated and unheated portions of the substrate such that human and machine readable images can be read.

In an embodiment, a flexible substrate is first coated with a pigmented thermally sensitive layer, and then the pigmented layer is overcoated with a white opaque thermally sensitive layer(s). In this embodiment, heat from the thermal printhead transparentizes all layers, allowing the underlying pigmented layer to increase in color saturation. Since the underlying pigmented thermosensitive layer is initially low in color saturation, thinner white opaque thermal sensitive overcoats are required to produce a thermosensitive substrate with low background density and high brightness. A thermosensitive substrate with low background color saturation capable of developing marks of high color saturation with selective application of heat from a thermal printhead has the advantage of being high in visual contrast, making it very suitable for human and machine-readable applications.

FIG. 1 is a schematic representation of a thermographic substrate 10 made in accordance with the processes described below.

The term "substrate" used in the description below refers to a flexible material or support that is coated with one or more layers of thermosensitive compositions. By way of illustration and not limitation, one may use one or more of the substrates described in U.S. Pat. Nos. 7,182,532; 6,694,885; 7,507,453; and 5,665,670. The entire contents of U.S. Pat. Nos. 7,182,532; 6,694,885; 7,507,453; and 5,665,670 are hereby incorporated by reference.

In the embodiment depicted in FIG. 1, the substrate 101 preferably comprises at least about 80 weight percent of or consists essentially of a cellulosic material such as paper.

When paper is used as substrate 101, the paper preferably has a weight per unit area of at least about 45 to about 200 grams per square meter. In one embodiment, the basis weight of the paper is from about 45 to about 65 grams per square meter.

In one embodiment, the substrate 101 is a 90 grams per square meter basis paper made from bleached softwood and hardwood fibers. In one aspect of this embodiment, the surface of this paper is sized with starch.

In one embodiment, the substrate 101 has a Sheffield smoothness of from about 1 to about 150 Sheffield Units and, more preferably, from about 1 to about 50 Sheffield Units. Means for determining Sheffield smoothness are well known; e.g., U.S. Pat. Nos. 5,451,559; 5,271,990; 5,716,900; 6,332,953; and 5,985,424. The entire contents of U.S. Pat. Nos. 5,451,559; 5,271,990; 5,716,900; 6,332,953; and 5,985,424 are hereby incorporated by reference.

In one embodiment, the substrate 101 may be comprised of a layered composite of natural and synthetic papers. Thus, by way of illustration, one may use one or more of the papers sold by the Pixelle Specialty Solutions Company or one may use Unitherm paper.

Such papers are made from a cellulose furnish that preferably is a mixture of softwood and hardwood Kraft, recycled paper, fillers and additives, and has an acidic pH. Addition of a sizing agent to the cellulose furnish improves water wicking resistance. The paper may be manufactured by conventional papermaking machines.

Paper substrate basis weights can range from about 30 lb/3000 $ft^2$ to about 55 lb/3000 $ft^2$. After the web is formed, the first or front side is machine glazed or restraint dried with a Yankee cylinder. The front side of the paper may be coated with a print receptive coating, such as an enamel coating, in conventional manner using any coating technique or equipment such as a blade coater. The paper may be coated with one or more pigments, one or more binders, and a salt. The pigment is chosen to provide a smooth surface on the coating. Preferred pigments are clay, magadiite, and mixtures thereof. Magadiite is a platy synthetic nano-pigment. The coating binder may be starch.

In another aspect of this embodiment, the substrate 101 is optionally comprised of clay or calcium carbonate treated synthetic papers. These synthetic papers are well known to those skilled in the art.

For example, one may use one or more of the synthetic papers sold by the Hop Industries Corporation, HOP 5.9 micrometers synthetic paper, or "HOP-SYN Synthetic Paper," DLI grade, which is clay modified polypropylene and is a calendared plastic sheet made from a mixture of clay, calcium carbonate, and polypropylene resin.

Additionally, one may use one or more of the synthetic papers available (as oriented polypropylene and polyethylene based synthetic papers) as "Yupo synthetic paper" from Oji-Yuka Synthetic Paper Co.; "Polyart synthetic paper" obtainable from Arjobex; or "Kimdura synthetic paper" sold by Neenah Paper Corporation. These and other synthetic papers are well known and are disclosed in U.S. Pat. Nos. 5,474,966; 6,086,987; 7,858,161; and 5,108,834 and disclosed in United States Published US Patent Application 2003/0089450. The entire contents of U.S. Pat. Nos. 5,474,966; 6,086,987; 7,858,161; and 5,108,834 and United States Published US Patent Application 2003/0089450 are hereby incorporated by reference into this specification.

In one embodiment, the substrate 101 may be at least 80 weight percent of a synthetic polymeric material such as polyethylene, polyester, nylon, polypropylene, polycarbonate, polyethylene-co-propylene, and the like.

In one embodiment, the substrate 101 comprises at least about 90 weight percent of polyethylene or polypropylene or polybutylene, polyvinyl chloride, polyethylene terephthalate, polycarbonate, and mixtures thereof.

The substrate 101 preferably has a thickness 106 of from about 25 micrometers to about 250 micrometers. It is preferred that the thickness of the support not vary across the substrate 101 by more than about 15 percent.

In one embodiment, the substrate 101 has a surface energy greater than 30 dynes per centimeter. U.S. Pat. Nos. 5,121,636; 6,225,409; 6,221,444; 6,075,965; 6,007,918; and 5,777,014 disclose surface energy and means for measuring it. The entire contents of U.S. Pat. Nos. 5,121,636; 6,225,409; 6,221,444; 6,075,965; 6,007,918; and 5,777,014 are hereby incorporated by reference.

In one embodiment, the substrate 101 has a surface energy of more than about 40 dynes per centimeters.

In one embodiment, the substrate 101 may comprise at least 80 weight percent of synthetic polymeric resins such as polyethylene, polyvinyl chloride polyester (such as polyethylene terephthalate), nylon, polyimide, polypropylene, polycarbonate, cellulose acetate, cellulose nitrate, polylactic acid, and the like. Such synthetic substrates 101, comprised of thermoplastics, may be extruded and biaxially oriented to form a film of uniform thickness and high surface smoothness.

Multilayer substrates 101 comprised of thermoplastics may be coextruded together such that composite film substrates are prepared. Such multi-layer substrates may differ in composition from core to skin. In one embodiment, the core of a multilayer substrate 101 is microvoided while the surface skins are unvoided.

U.S. Pat. No. 5,604,078 describes various microvoided substrates. The entire content of U.S. Pat. No. 5,604,078 is hereby incorporated by reference.

As is disclosed U.S. Pat. No. 5,604,078, microvoided composite packaging films are conveniently manufactured by coextrusion of the core and color layers, with subsequent biaxial orientation, whereby voids are formed around void-initiating material contained in the core layer. Such composite films are disclosed in, for example, U.S. Pat. No. 4,377,616.

The core of the composite film should be from 15 to 95% of the total thickness of the film, preferably from 30 to 85% of the total thickness. The non-voided skin(s) should thus be from 5 to 85% of the film, preferably from 15 to 70% of the thickness. The density (specific gravity) of the composite film should be between 0.2 and 1.0 g/cm·sup·3, preferably between 0.3 and 0.7 g/cm·sup·3. As the core thickness becomes less than 30% or as the specific gravity is increased above 0.7 g/cm·sup·3, the composite film starts to lose useful compressibility and thermal insulating properties. As the core thickness is increased above 85% or as the specific gravity becomes less than 0.3 g/cm·sup·3, the composite film becomes less manufacturable due to a drop in tensile strength and it becomes more susceptible to physical damage.

The total thickness of the composite film can range from 20 to 150 μm, preferably from 30 to 70 μm. Below 30 μm, the microvoided films may not be thick enough to minimize any inherent non-planarity in the support and would be more difficult to manufacture. At thicknesses higher than 70 μm, little improvement in either print uniformity or thermal efficiency is seen, and so there is little justification for the further increase in cost for extra materials.

U.S. Pat. No. 4,377,616 discloses that void means devoid of added solid and liquid matter, although it is likely the "voids" contain gas. The void-initiating particles which remain in the finished packaging film core should be from 0.1 to 10 μm in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the film.

The Z-direction axis is a minor dimension and is roughly the size of the cross diameter of the voiding particle. The voids generally tend to be closed cells, and thus there is virtually no path open from one side of the voided core to the other side through which gas or liquid can traverse. The entire content of U.S. Pat. No. 4,377,616 is hereby incorporated by reference.

Referring again to FIG. 1, and in another embodiment, such substrate(s) 101 may be deposited from solvents onto a smooth drum and dried.

In an embodiment the substrate 101 is comprised of a renewable material such as cellulose, cellulose derivative(s), polylactic acid, and the like.

As the substrate usable in the present invention, there are preferred polyester films such as polyethylene terephthalate film, polybutylene terephthalate film, polyethylene naphthalate film, polybutylene naphthalate film, polyarylate film, polycarbonate film, polyamide film, aramid film, polyether sulfone film, polysulfone film, polyphenylene sulfide film, polyether ether ketone film, polyether imide film, modified polyphenylene ether film and polyacetal film, and other various plastic films commonly used for the support of recording media of this type.

In preferred embodiment, the substrate 101 either consists essentially of or comprises at least 80 weight percent of a synthetic polymeric resin such as polyethylene, polyester, nylon, polypropylene, polycarbonate, cellulose acetate, cellulose nitrate, polylactic acid, and the like.

In an embodiment, the uncoated substrate 101 has a surface energy greater than 35 dynes per centimeter and a smoothness of from about 10 to about 150 Sheffield Units.

Referring again to FIG. 1, in one embodiment, the substrate 101 is paper that is preferably coated with and contiguous with a color layer 201 comprised of resin. The paper may be extrusion coated with a resin at a coat weight of 10 to 40 grams per square meter. In this embodiment, the resin comprises a polyolefin such as polyethylene, polypropylene, polybutylene, and mixtures thereof. The resin may be coated means of extrusion, at a temperature of from about 200 to about 300° C. Extrusion coating of a resin is well known as disclosed in U.S. Pat. Nos. 5,104,722; 4,481,352; 4,389,445; 5,093,306; and 5,895,542. The entire contents of each of U.S. Pat. Nos. 5,104,722; 4,481,352; 4,389,445; 5,093,306; and 5,895,542 are hereby incorporated by reference.

In an embodiment, substrate 101 is white in color. In another embodiment, substrate 101 is colored and is comprised of colorant. The term colorant is defined elsewhere in this specification.

Referring again to FIG. 1, in one embodiment, the substrate 101 may be overcoated with color layer 201. Color layer 201 is comprised of one or more colorants 202 and binders 203. Colorants 202 impart color to the layer and are comprised of dyes and/or pigments. Binder 203 binds the colorant(s) to the substrate 101 and is comprised of polymers, resins, waxes and the like. By way of example, such binders 203 may be such as those described in U.S. Pat. No. 4,521,494. The entire content of U.S. Pat. No. 4,521,494 is hereby incorporated by reference.

In one embodiment, the color layer 201 may have a surface energy greater than 30 dynes per centimeter.

In one embodiment, the color layer 201 may comprise a material that, when coated upon the substrate 101, provides a smooth surface with a surface energy of at least 35 dynes per centimeter. The color layer 201 may optionally be treated with by flame, plasma, or corona to raise the surface energy to at least 40 dynes per cm.

In one embodiment, the color layer coating 201 may be substantially smooth. In one aspect, the coated substrate has a Sheffield smoothness of from about 1 to about 150 Sheffield Units, and more preferably, from about 1 to about 50 Sheffield units.

Referring again to FIG. 1, and in the embodiment depicted therein, the color layer 201 may be of any composition that will produce the desired surface energy and smoothness upon coating the substrate 101. One may utilize cured or uncured polyurethane, polyvinyl chloride, polyacrylate, polystyrene, polyolefin, polyimide, polyester, polyvinyl alcohol, polyimide, polyurea, and/or combinations thereof.

In one embodiment, and referring again to FIG. 1, color layer 201 may be comprised of voids.

Color layer 201 may comprise one or more thermoplastic binder materials 203 in a concentration of from about 5 to about 95 percent, based upon the dry weight of colorant 202 and binder 203 in color layer 201. In one embodiment, the binder 203 is present in a concentration of from about 66 to about 95 percent. In another embodiment, the color layer 201 comprises from about 75 to about 90 weight percent of binder 203.

One may use any of the polymeric binders 203 known to those skilled in the art or as disclosed in U.S. Pat. Nos. 6,127,316; 6,124,239; 6,114,088; 6,113,725; 6,083,610; 6,031,556; 6,031,021; 6,013,409; 6,008,157; and 5,985,076.

The entire contents U.S. Pat. Nos. 6,127,316; 6,124,239; 6,114,088; 6,113,725; 6,083,610; 6,031,556; 6,031,021; 6,013,409; 6,008,157; and 5,985,076 are hereby incorporated by reference.

One may use a binder 203 which has a multiplicity of polar moieties such as one or more carboxyl groups, hydroxyl groups, chloride groups, carboxylic acid groups, urethane groups, amide groups, amine groups, urea, epoxy resins, mixtures thereof, and the like. Some suitable binders within this class include polyester resins, bisphenol-A polyesters, polyvinyl chloride, copolymers made from terephthalic acid, polymethyl methacrylate, vinylchloride/vinylacetate resins, epoxy resins, nylon resins, urethane-formaldehyde resins, polyurethane, mixtures thereof, and the like.

In one embodiment, the binder 203 may comprise a mixture of two or more synthetic resins. One may use a mixture comprising from about 40 to about 60 weight percent of polymethyl methacrylate and from about 40 to about 60 weight percent of vinylchloride/vinylacetate resin. In this embodiment, these materials collectively comprise the binder.

In one embodiment, the binder 203 may comprise polybutylmethacrylate and polymethylmethacrylate, comprising from 10 to 30 percent of polybutylmethacrylate and from 50 to 80 percent of the polymethyl methacrylate. In one embodiment, this binder comprises cellulose acetate propionate, ethylenevinylacetate, vinyl chloride/vinyl acetate, urethanes, etc.

Referring again to FIG. 1, optional color layer 201 may comprise colorant 202. The colorant 202 may comprise one or more dyes or pigments.

In one embodiment, one or more of such colorants are light stable pigments that may be organic or inorganic. Herbst and Hunger in their book "Industrial Organic Pigments," classify colorants as either dyes or pigments. Pigments are defined as inorganic or organic, colored, white or black materials which are practically insoluble in the medium in which they are incorporated. While most inorganic pigments are stable against fading due to exposure to sunlight, their colors are often muted and many hues cannot be produced. Organic pigments on the other hand are capable of creating a large number of hues but their resistance to fade is largely dependent upon their chemical structure and crystal form.

In one embodiment, the colorants 202 are various organic and inorganic pigments as well as carbon black. Examples of such organic and inorganic pigments include azo pigments (such as monoazo yellow and orange, disazo, beta-naphthol, naphthol AS reds, azo lake, benzimidazolone, disazo condensation, metal complex azo, isoindolinone, isoindoline), polycyclic pigments (such as quinacridone, perylene, perinone, diketopyrrolo pyrrole and thioindigo), anthraquinone pigments (such as anthrapyrimidine, flavanthrone, pyranthrone, anthanthrone, dioxazine, triarylcarbonium and quinophthalone), phthalocyanine pigments, nitro pigments, nitroso pigments, nigrosine pigments, titanium white, calcium carbonate and barium sulfate. Such pigments may be used in combination with dyes for adjusting the color of the ink layer. The content of the coloring agent in the ink layer is preferably from about 1 percent to about 50 percent more preferably from about 5 percent to about 33 percent.

The colorant 202 may take the form of a soluble dye dissolved in the binder 203 of color layer 201. Preferably, the colorant 202 is comprised of a pigment dispersed in the binder 203 of color layer 201. Additionally, any additive known to those skilled in the art such as dispersants, rheology modifiers, defoamers, surfactants, wetting agents, etc., may also be included as needed.

In an embodiment, the coating fluid used to prepare color layer 201 is comprised of a surfactant. Surfactants are defined as "surface active agents" in Webster's Third International Dictionary (Unabridged). The use of surfactants in coating compositions is disclosed in U.S. Pat. No. 4,370,412. The entire content of U.S. Pat. No. 4,370,412 is hereby incorporated by reference.

Surfactants are compounds that lower the surface tension of a liquid, the interfacial tension between two liquids, or the interfacial tension between a liquid and a solid. Surfactants are used as detergents, wetting agents, emulsifiers, foaming agents, and dispersants. Surfactants are usually organic compounds that are amphiphilic, meaning they contain both hydrophobic groups (their tails) and hydrophilic groups (their heads). Therefore, a surfactant molecule contains both a water insoluble (oil soluble component) and a water soluble component.

Surfactants reduce the surface tension of water by adsorbing at the liquid-gas interface. In addition, they reduce the interfacial tension between oil and water by adsorbing at the liquid-liquid interface. Surfactants are also often classified into four primary groups; anionic, cationic, non-ionic, and zwitterionic (dual charge).

In an embodiment, the color layer 201 may be comprised of a defoamer. The use of defoamers in coated layers is disclosed in U.S. Pat. No. 6,331,585. The entire content of U.S. Pat. No. 6,331,585 is hereby incorporated by reference.

The action of a defoamer is defined in Webster's Third International Dictionary (Unabridged) as "to remove the foam from." Thus, a defoamer or an anti-foaming agent is a chemical additive that reduces and hinders the formation of foam in industrial process liquids.

Generally, a defoamer is insoluble in the foaming medium and has surface active properties. An essential feature of a defoamer is low viscosity and a facility to spread rapidly on foamy surfaces. Defoamers have an affinity to the air-liquid surface where they destabilize foam, causing the rupture of air bubbles and breakdown of surface foam. Defoamers also help entrained air bubbles to agglomerate and form larger bubbles which, in turn, can rise to the surface of the bulk liquid more quickly. There are several different types of defoamers, for example oil based, powder, water based, silicone based and alkyl polyacrylates.

Defoamers are well known and are disclosed in U.S. Pat. No. 7,910,633. The entire content of U.S. Pat. No. 7,910,633 is hereby incorporated by reference.

In an embodiment, color layer 201 may also comprise dispersants to facilitate the dispersion of pigment based colorants 202. Dispersants are surface active compounds which help to separate pigment agglomerates into their primary particles in the dispersion process; e.g., U.S. Pat. No. 4,522,654. The entire content of U.S. Pat. No. 4,522,654 is hereby incorporated by reference.

In one embodiment, colorant 202 may be comprised of one or more transparent organic pigments such as Naphthol Yellow S, Hansa Yellow 5G, Hansa Yellow 3G, Hansa Yellow G, Hansa Yellow GR, Hansa Yellow A, Hansa Yellow RN, Hansa Yellow R, Benzidine Yellow, Benzidine Yellow G, Benzidine Yellow GR, Permanent Yellow NCG and Quinoline Yellow Lake, Permanent Red 4R, Brilliant Fast Scarlet, Brilliant Carmine BS, Permanent Carmine FB, Lithol Red, Permanent Red FSR, Brilliant Carmine 6B, Pigment Scarlet 3B, Rhodamine Lake B, Rhodamine Lake Y and Arizalin Lake, Victoria Blue Lake, metal-free Phthalocyanine Blue, Phthalocyanine Blue and Fast Sky Blue, and dyes such as Rhodamine, Victoria Blue and carbon black. These coloring agents may be used either alone or in combination.

As used in this specification, the term "transparent pigment" refers to a pigment which gives a transparently colored ink when dispersed in binder 203 of color layer 201.

In one embodiment, the colorant 202 may comprise one or more inorganic pigments. Thus, for example, a blue colorant can contain the oxides of a cobalt, chromium, aluminum, copper, manganese, zinc, etc. Thus, e.g., a yellow colorant can contain the oxides of one or more of lead, antimony, zinc, titanium, vanadium, gold, and the like. Thus, e.g., a red colorant can contain the oxides of one or more of chromium, iron (two valence states), zinc, gold, cadmium, selenium, or copper. Thus, e.g., a black colorant can contain the oxides of the metals of copper, chromium, cobalt, iron (plus two valence), nickel, manganese, and the like. Furthermore, in general, one may use colorants comprised of the oxides of calcium, cadmium, zinc, aluminum, silicon, etc.

Suitable pigments and colorants are well known to those skilled in the art and disclosed by U.S. Pat. Nos. 6,120,637; 6,108,456; 6,106,910; 6,103,389; 6,083,872; 6,077,594; 6,075,927; 6,057,028; 6,040,269; 6,040,267; 6,031,021; 6,004,718; and 5,977,263. The entire contents of U.S. Pat. Nos. 6,120,637; 6,108,456; 6,106,910; 6,103,389; 6,083,872; 6,077,594; 6,075,927; 6,057,028; 6,040,269; 6,040,267; 6,031,021; 6,004,718; and 5,977,263 are hereby incorporated by reference.

Color layer 201 preferably has a thickness 206 from about 0.01 micrometers to about 25 micrometers.

In one embodiment, color layer 201 has a thickness 206 from about 0.1 micrometers to about 10 micrometers.

In another embodiment, color layer 201 has a thickness 206 from about 0.5 micrometers to about 5 micrometers.

Referring again to FIG. 1 and in the embodiment depicted therein, thermosensitive layer 301 is comprised of thermal solvents 303 and optional binders 302. Thermosensitive layer 301 is opaque, blocking a portion of light from passing directly through the layer. Thermal sensitive layer 301 increases the brightness of thermographic substrate 10 when coated over color layer 201 of the substrate 10.

In one embodiment, the thermosensitive layer 301 is comprised of one or more of thermal solvents 303. Some of the thermal solvents known to those in the art are described in this specification. It is to be understood that many other prior art thermal solvents also may be used.

Webster's Third International Dictionary (unabridged) defines solvent as "a substance capable of or used in dissolving or dispersing one or more other substances." Thermal solvents are compounds whose activity is increased with heat and act as solvents for various components of the thermosensitive layer, helping to accelerate the transparentization of thermosensitive and opaque layers at elevated temperatures.

In one embodiment, thermosensitive layer 301 is coated directly on color layer 201.

In another embodiment thermosensitive layer 501 is coated directly on thermosensitive foam layer 401.

In another embodiment thermosensitive layer 301 is coated over color layer 201, thermosensitive foam layer 401 is overcoated on the layer 301 and thermosensitive layer 501 is coated over the layer 401.

In another embodiment, thermosensitive layer 501 is coated onto the barrier film 602 of thermographic substrate 906 and laminated onto thermosensitive foam layer 401.

In another embodiment, thermosensitive layer 501 is coated onto the barrier film 602, an adhesive layer 1101 is applied to thermosensitive layer 501, a heat resistant topcoat 701 is coated onto the top surface 604 of barrier film 602 to form thermographic barrier film 906 which in turn is laminated onto thermosensitive foam layer 401 of thermosensitive substrate 806 to form thermographic substrate 10.

Upon application of heat and pressure to the thermographic substrate 10 in the thermal printing process, thermal solvent 303 is melted and thermosensitive layers 301 and/or 501 are transparentized. In addition, melted thermal solvent 303 from layers 301 and/or 501 facilitates the transparentization of opaque thermosensitive foam layer 401. This facility for transparentizing layer 401 is enhanced when the solubility characteristics of thermal solvent 303 are similar to the solubility characteristics of the elastomer used in opaque thermosensitive foam layer 401.

Thermosensitive layers 301 and 501 are coated from a dispersion comprising particles of thermal solvent 303 suspended in water. After coating and drying of the thermal solvent dispersion, a thermosensitive layer 301 is formed. Thermosensitive layer 301 is opaque covers and obscures color layer 201. Thermosensitive layer 501 is opaque and covers thermosensitive foam layer 401. The degree to which layers 301, 401 and 501 covers and obscures color layer 201 can be measured by the increase in the brightness (L*) of the thermographic substrate 10 after coating the layers over color layer 201.

Brightness (L*) is the measurement of the light reflectivity of a substrate. The measurement of L* is specified by the International Commission on Illumination Brightness in the L*a*b* color spaces (also referred to as CIELAB). CIELAB defines the 3-dimensional color space of an article with L* brightness coordinate light (white) to dark (black), a* chromaticity coordinates from red to green, and b* chromaticity coordinates from yellow to blue. L* values are measured under 2° of viewing angle and its value is from darkest value 0 (black) to brightest value 100 (white).

Opaque thermosensitive layers comprising thermal solvents increase the brightness of a color layer 201 coated substrate 101 from an L* of <15 to an L* of >70. Such thermosensitive layers are transparentizable with the heat and pressure supplied by a thermal printer, reducing the brightness to L*<15 in printed areas and thus providing good printing contrast for human and machine readable information. However, since thermosensitive layers are particulate in nature and do not form continuous films, they have poor scratch durability. In a preferred embodiment, thermosensitive layers 301 and 501 are used in combination with opaque thermosensitive voided elastomer layers, the combination of which provides the thermographic substrate 10 with high brightness, good thermal printing sensitivity (easily transparentized) and good durability (scratch, bruise and fade resistance).

Examples of thermal solvents are disclosed in U.S. Pat. No. 5,320,929. The entire content of U.S. Pat. No. 5,320,929 is hereby incorporated by reference.

Thermal solvents have been extensively used in photothermographic imaging elements as disclosed in U.S. Pat. Nos. 5,436,108; 5,328,799; 6,596,470; and 6,790,569. The entire contents of U.S. Pat. Nos. 5,436,108; 5,328,799; 6,596,470; and 6,790,569 are hereby incorporated by reference.

U.S. Pat. No. 5,436,109 discloses the use of thermal solvents in photothermographic imaging systems.

Alkyl and aryl amides are disclosed as "heat solvents" in U.S. Pat. No. 4,770,981, and a variety of benzamides have been disclosed as "heat solvents" in U.S. Pat. No. 4,983,502. The entire contents of U.S. Pat. Nos. 4,770,981 and 4,983,502 are hereby incorporated by reference.

Polyglycols, derivatives of polyethylene oxides, beeswax, monostearin, high dielectric constant compounds having an —$SO_2$— or —CO— group such as acetamide, ethylcarbamate, urea, methylsulfonamide, polar substances are described in U.S. Pat. No. 3,667,959, the lactone of 4-hydroxybutanoic acid, methyl anisate, and related compounds are disclosed as thermal solvents in such systems. The entire content of U.S. Pat. No. 3,667,959 is hereby incorporated by reference.

The role of thermal solvents in these systems is not clear, but it is believed that such thermal solvents promote the diffusion of reactants at the time of thermal development. U.S. Pat. No. 4,584,267 discloses the use of similar components (such as methyl anisate) as "heat fusers" in thermally developable light-sensitive materials. The entire content of U.S. Pat. No. 4,584,267 is hereby incorporated by reference.

Thermal solvents 303 can also facilitate the collapse of thermosensitive foams at temperature and pressure conditions which can be achieved in a thermal imaging printer. While some thermosensitive foam layers 401 can be collapsed and transparentized without the aid of a thermal solvent 303, others will not fully collapse in the thermal printing process without the presence of a thermal solvent 303.

While the temperatures which the thermal printer can achieve in a thermosensitive layer may be high (200 to 400° C.), the duration of such temperatures in the layer is relatively short (less than 1 ms). Even at the extreme conditions found between the printhead and platen roller of a thermal printer there is typically not sufficient heat, pressure, and time to allow the many voided elastomers to relax sufficiently to collapse and release the gas contained therein. Certain thermal solvents can positively interact with the heat and pressure supplied by a thermal printer in the time scale of the heating to facilitate the collapse of the voided elastomer in the foam layer 401; in particular, the use of one or more appropriate thermal solvents in their system lowers the energy required for such collapse and resulting transparentization.

Thermal solvents 303 incorporated into thermosensitive layer 301 preferably are prevented from combining with or dissolving into elastomers 402 within the layer in order to maintain the opacity of the layer in non-thermally imaged areas. Without wishing to be bound to any particular theory, applicants believe that premature collapse of the thermosensitive foam would increase the transparency of the layer 401, defeating the function of the layer as a heat sensitive imaging layer.

Separation of the thermal solvents 303 from the elastomeric binder 402 can be accomplished in many ways. The thermal solvents 303 may be physically separated from thermosensitive foam layer 401 by coating the agents in a layer adjacent to thermosensitive layer 401 or alternatively and additionally, the thermal solvents may be dispersed as solid, crystalline particles within the thermosensitive layer. Thermal solvents 303 may also be encapsulated and then dispersed into thermosensitive layer 401, wherein the capsules are broken or fractured in the thermal printing process, releasing the thermal solvent to facilitate the collapse and transparentization of the thermosensitive layer 401.

The particle size of solid dispersed thermal solvents is preferably less than 5 micrometers and more preferably less than 1 micrometer and most preferably less than 0.4 micrometer.

Solid thermal solvents 303 may be either amorphous or crystalline or semicrystalline. In the case of crystalline or semicrystalline agents 303, the melting point is preferably less than 200° C., more preferably less than 150° C., and most preferably less than 100° C. Polar waxes can act as thermal solvents 303.

In one embodiment, the thermal solvents preferably have solubility characteristics similar to those of the voided elastomer. The Hildebrand solubility parameter is described in U.S. Pat. No. 7,465,343. The entire content of U.S. Pat. No. 7,465,343 is hereby incorporated by reference.

The Hildebrand solubility parameter that is discussed in the Prasad patent also is discussed in Billmeyer's "Textbook of Polymer Science," $2^{nd}$ Edition, Wiley-Interscience, New York, 1962. As is disclosed in such text, the Hildebrand solubility parameter is the square root of the cohesive energy density (energy/unit volume) of a material. Thus, the solubility parameter is the square root of calories/cubic cm or in SI units, joule/cubic meter. In SI units a pascal is defined as one joule per cubic meter. Thus, in this specification the units for solubility parameter shall be referred to as the square root of megapascal's or $MPa^{1/2}$.

Solubility parameters are described in many scientific articles and books. By way of illustration, the "Polymer Data Handbook, Basic Edition," compiled by The Society of Polymer Science, Japan and published by Baifukan Co., Ltd. has tables on solubility parameters by solvent, so that a decision may be made on the choice of the heat stabilizing solvents suitable for the instant invention. Other references giving considerations to solubility parameters include Ind. Chem. Prod. Res. Dev. 8, Mar. 1969, p.2-11, Chemical Reviews, 75(1975), p.731-753, and Encyclopedia of Chemical Technology, 2nd Edition, Supplement Volume (1971), p.889-910.

Suitable thermal solvents 303 will dissolve, swell, plasticize, or mix with thermosensitive foams under conditions of elevated temperature. Thermal solvents 303 are in the solid state then they must first melt or liquefy with the heat provided from the thermal printer and then come into direct contact with the thermosensitive foam by means of diffusion, capillary action, flow and the like.

According to U.S. Pat. No. 7,041,369, compatible materials have a difference in solubility parameter of less than about 10 $Megapascals^{1/2}$. The entire content of U.S. Pat. No. 7,041,369 is hereby incorporated by reference.

Without wishing to be bound to any particular theory, the inventors believe that the thermal solvent 303 facilitates the thermally induced collapse of the thermosensitive foam layer 401 if the thermal solvents solubility parameter is within about 10 $Megapascals^{1/2}$ of the material. The solubility parameter of polystyrene is reported in the Polymer Handbook, $3^{rd}$ Edition, John Wiley & Sons, N Y 1989, pp. VII 554-555, and it ranges from 15.6 to 21 $Megapascals^{1/2}$.

Another suitable measure of solubility is Log P. Published United States Patent Application 2015/0112425 describes the use of Log P as a measure of compounds relative solubility characteristics. The octanol-water partition coefficient (P) is the ratio of distribution of a compound in a mixture of 1-octanol and $H_2O$. Log P is the base 10 logarithm of the partition coefficient. Compounds with Log P values greater than about 1 are considered lipophilic (greater solubility in 1-octanol versus $H_2O$). One can use a variety of computerized protocols to perform calculated estimates of the Log P value. The entire content of Published United States Patent Application 2015/0112425 is hereby incorporated by reference.

Without wishing to be bound to any particular theory, the inventors believe that the thermal solvent 303 facilitates the thermally induced collapse of the thermosensitive foam layer 401 comprised of elastomer 402 if the thermal solvents Log P is within about 10 units of the Log P of elastomer 402, preferably within 6 units of the elastomer, most preferably within 3 units of the elastomer.

Furthermore, thermal solvents useful in the present invention include polar organic compounds such as the polyglycols described in U.S. Pat. No. 3,347,675 and the compounds described in U.S. Pat. No. 3,667,959; urea derivatives, e.g., dimethylurea, diethylurea and phenylurea; amide derivatives, e.g., acetamide, benzamide and p-toluamide; sulfonamide derivatives, e.g., benzenesulfonamide and .alpha.-toluenesulfonamide; and polyhydric alcohols, e.g., 1,2-cyclohexanediol and pentaerythritol. The entire contents of U.S. Pat. Nos. 3,347,675 and 3,667,959 are hereby incorporated by reference.

Solid plasticizers are disclosed in U.S. Pat. No. 7,651,747. U.S. Pat. No. 7,651,747 discloses that solid plasticizers are known in the art and may include a phthalate compound, a terephthalate compound, an isophthalate compound, a benzoate compound, a polymeric adipate compound, or mixtures thereof. Examples of the solid plasticizer include, but are not limited to, sucrose benzoate, 1,4-cyclohexanedimethanol dibenzoate, glyceryl tribenzoate, dicyclohexyl phthalate, benzyl 2-naphthyl ether, dimethyl terephthalate, 2-chloropropionanilide, 4-benzyldiphenyl, dibenzyl oxalate, m-terphenyl, diphenyl phthalate, diphenyl isophthalate, dihexyl phthalate, diactyl phthalate, cumylphenyl isophthalate, dehydroabietyl phthalate, dimethyl isophthalate, ethylene glycol dibenzoate, trimethylolethane tribenzoate, pentaerythritol tetrabenzoate, sucrose octaacetate, tricyclohexyl citrate, N-cyclohexyl-p-toluenesulfonamide, o,p-toluenesulfonamide, N-ethyl-p-toluenesulfonamide, N-butyl-p-toluenesulfonamide, n-tallow-4-toluenesulfonamide, p-toluenesulfonamide-formaldehyde resin, 1,2-di-(3-methylphenoxy)ethane, or mixtures thereof. The solid plasticizer 12 may have an average particle size of less than approximately 5 μm, such as less than approximately 0.5 μm. The entire content of U.S. Pat. No. 7,651,747 is hereby incorporated by reference In one embodiment, the solid plasticizer is selected from the group consisting of "sucrose benzoate, 1,4-cyclohexanedimethanol dibenzoate, glyceryl tribenzoate, dicyclohexyl phthalate, benzyl 2-naphthyl ether, dimethyl terephthalate, 2-chloropropionanilide, 4-benzyldiphenyl, dibenzyl oxalate, m-terphenyl, diphenyl phthalate, diphenyl isophthalate, o,p-toluenesulfonamide, N-cyclohexyl-p-toluenesulfonamide, 1,2-di-(3-methylphenoxy)ethane, or mixtures thereof.

The entire content of U.S. Pat. No. 5,436,109 is hereby incorporated herein by reference.

Thermal solvents 303 may be solid materials, such as the sensitizers described in U.S. Pat. No. 5,888,283. The entire content of U.S. Pat. No. 5,888,283 is hereby incorporated herein by reference. U.S. Pat. No. 5,888,283 discloses that suitable sensitizers for use in the ink composition include diphenoxyethane, aryl or alkyl-substituted biphenyls such as p-benzyl biphenyl, or toluidide phenyl hydroxynaphthoates and aromatic diesters such as dimethyl or dibenzyl terephthalate and dibenzyl oxalate. These materials may be used alone, or they may be combined with waxes or fatty acids.

A sensitizer for use is p-benzyl biphenyl. The sensitizer preferably has a softening point of between about 80 degrees Fahrenheit to 85 degrees Fahrenheit (27 degrees Celsius to 29 degrees Celsius) and a melting point of between about 140 degrees Fahrenheit to 150 degrees Fahrenheit (60 degrees Celsius to 65 degrees Celsius). When the sensitizer is heated to its melting point (such as by the printhead in a direct thermal printer), it melts and lowers the melting point of adjacent color developer and color former particles, causing them to dissolve, react, and form a desired color.

One may use one or more of the sensitizers disclosed in U.S. Pat. No. 5,883,043. The entire content of U.S. Pat. No. 5,883,043 is hereby incorporated by reference.

In one embodiment, the thermal solvents used include dibenzyl oxalate, carnauba wax, 1, 2-bis (3-methylphenoxy) ethane and the like.

Referring again to FIG. 1, thermosensitive layer 301 is preferably comprised of 5 to about 90 weight percent of thermal solvent 303 and, more preferably, from about 50 to about 95 percent of such solvent. In one aspect of this embodiment, the concentration of such thermal solvent is from about 75 to about 100 weight percent.

Referring again to FIG. 1, and in the embodiment depicted therein, thermographic substrate 10 is comprised of a thermosensitive foam layer 401. The Webster's Third New International Dictionary (Unabridged) defines thermosensitive as "relating to or being a material that is in one or more ways sensitive to heat."

Referring again to FIG. 1 and in the embodiment depicted therein, thermosensitive foam layer 401 is comprised of voided elastomers. Those skilled in the art are aware of various means for producing an elastomeric coating that is comprised of voids.

For example, in U.S. Pat. No. 6,402,865 describes the use of blowing agents to create holes or voids in a layer structure. The layered morphology development process in a polymer containing dissolved blowing agent is similar to the microcellular foaming process; e.g., U.S. Pat. Nos. 4,473,665; 5,223,545; and 5,670,102. The entire contents of U.S. Pat. Nos. 6,402,865; 4,473,665; 5,223,545; and 5,670,102 are hereby incorporated by reference.

Voids 403 may also be created within a layer by incorporation of incompatible particles within the layer 401 and then orienting or stretching the layer; e.g., U.S. Pat. Nos. 6,958,860; 5,494,735; 6,596,451; 5,462,788; 5,935,904; and 7,762,188. The entire contents of U.S. Pat. Nos. 6,958,860; 5,494,735; 6,596,451; 5,462,788; 5,935,904; and 7,762,188 are hereby incorporated by reference.

Voids 403 may also be created within layer 401 by incorporation of expandable particles. U.S. Pat. No. 5,834,526 discloses the use of the expandable particles in various packaging materials. Thermoplastic hollow expandable particles having volatile liquid blowing agents encapsulated therein are described in U.S. Pat. No. 3,615,972. The entire contents of U.S. Pat. Nos. 5,834,526 and 3,615,972 are hereby incorporated by reference.

The blowing agents are described as aliphatic hydrocarbons, chlorofluorocarbons, or tetraalkyl silanes. The particles are prepared by combining an oil phase containing monomer and blowing agent with an aqueous phase, and agitating violently. Use of perfluorinated blowing agents or ways to improve encapsulation of such blowing agents is not described.

Voids 403 may also be incorporated into thermosensitive foam layer 401 by the addition of hollow sphere organic pigments which are described elsewhere in this specification.

Referring again to FIG. 1, voids may also be incorporated into thermosensitive foam layer 401 by mechanically frothing the elastomer binder 402 to create a foam and coating the foam onto the thermographic substrate 10. U.S. Pat. No. 8,476,330 discloses a fine-celled polyurethane foam obtained from frothing a polyurethane foam-forming composition having low density imparted from a synergistic combination of polysiloxane/polyoxyalkylene (AB)n-type and polysiloxane-polyoxyalkylene pendant-type surfactants. The produced foam may be more cost efficient due to being lighter in weight because of its decreased density. The process can be used with or without chemical blowing assistance, e.g., from the water/isocyanate reaction or from auxiliary blowing agents. The entire content of U.S. Pat. No. 8,476,330 is hereby incorporated by reference.

Thermosensitive foam layer 401 preferably has a thickness 406 from about 1 μm to about 1000 μm.

In one embodiment, thermosensitive foam layer 401 has a thickness 406 from about 10 μm to about 500 μm.

In another embodiment, thermosensitive foam layer 401 has a thickness 406 from about 25 μm to about 250 μm.

In another embodiment, thermosensitive foam layer 401 contains voids. Such voids, in one aspect of this embodiment, have an average diameter from 1 μm to about 500 μm.

In another embodiment, thermosensitive foam layer 401 contains voids. Such voids, in one aspect of this embodiment, have an average diameter from 5 μm to about 350 μm.

In another embodiment, thermosensitive foam layer 401 contains voids. Such voids, in one aspect of this embodiment, have an average diameter from 10 μm to about 200 μm.

In another embodiment, thermosensitive foam layer 401 contains voids. Such voids, in one aspect of this embodiment, have an average diameter from 20 μm to about 100 μm.

In another embodiment, thermosensitive foam layer 401 has a density of 0.05 to 0.9 g/cc, more preferably from 0.05 to 0.5 g/cc, most preferably from 0.5 to 0.25 g/cc.

Certain thermosensitive foam layers 401 can create high brightness when coated over colored substrates. Additionally, such foam layers positively interact with the heat and pressure supplied by a thermal printer in the time scale of the heating to facilitate the collapse and transparentization of the foam layer 401; in particular, they have discovered that the use of one or more voided elastomers are sufficient for excellent transparentization in the thermal printing process to print images with sufficient contrast for good human and machine readable codes with good resistance to damage from exposure to light, scratches and bumps and other mechanical stresses which may damage thermographic substrates.

Thermosensitive layers and the thermal printing process used to image them are well known to those skilled in the art. U.S. Pat. No. 7,671,878 discloses a thermal printer comprising a feeding mechanism which feeds one of thermal papers which include a double-sided thermal paper having thermosensitive layers formed on both sides thereof and a single-sided thermal paper having a thermosensitive layer formed on one side thereof; a first thermal head which is so provided as to be brought into contact with a first side of the thermal paper fed by the feeding mechanism and is configured to print an image on the first side of the paper; a second thermal head which is so provided as to be brought into contact with a second side of the thermal paper fed by the feeding mechanism and is configured to print an image on the second side of the paper. The entire content of U.S. Pat. No. 7,671,878 is hereby incorporated by reference.

In one embodiment, two different thermosensitive layers are preferably used, one that goes from gray to black, and another that goes from white to clear. It is to be understood that, although applicants have disclosed particular preferred embodiments of each of these individual thermosensitive elements, other "prior art" individual thermosensitive elements also may be used.

Referring again to FIG. 1, and to the embodiment depicted therein, thermosensitive foam layer 401 is coated over color layer 201. Such compositions, when applied to thin, flexible substrates, have a variety of digital thermal printing applications such as, e.g., receipts, tickets, labels, tags, bar codes, and the like.

Thermosensitive foam layer 401 enables the direct thermal imaging of substrates with several advantages: (1) no leuco dyes or phenolic compounds are required, (2) no expensive silver-based chemistry is required, (3) no difficult control blushing lacquers are required, (4) layers may be coated from water, eliminating the need for expensive solvent coating vehicles, (5) a light-stable color dye or pigment may be used, offering a nearly limitless variety of imaged colors, (6) thermal imaging of the substrate is accomplished with a digital thermal printer, (7) images have excellent durability, being resistant to fade, scratch, etc.

In one embodiment, the thermosensitive foam layer 401 is comprised of elastomeric binders 402, optional thermal solvents 303, polymer particles 404, optional colorants 202, and voids 403.

Thermosensitive foam layer 401 is preferably coated from water, although such thermosensitive layer may be coated from other solvents or, alternatively, may be a 100 percent solid system that is in a liquid phase when coated and under the conditions of the coating.

In one embodiment, water-based compositions are prepared such that many of the components remain separated and not intimately mixed at the time of coating and drying. In one embodiment, thermosensitive foam layer 401 is comprised of dispersions, emulsions, polymer lattices and colloids, voids, surfactants, foam stabilizers, gas and the like.

In one embodiment, thermosensitive foam layer 401 is comprised of an elastomeric binder 402 in which the dispersions, emulsions, polymer lattices, colloids and particles, hollow microsphere polymer pigments, voids, surfactants, foam stabilizers and gases are contained and bound to adjacent layers in the thermographic substrate 10.

Thermosensitive foam layer 401 preferably has a coating thickness 406 of 1 to 1000 micrometers, more preferably from 25 to 500 micrometers and most preferably from 50 to 250 micrometers.

U.S. Pat. No. 5,162,289 describes hollow microsphere polymer pigment. Plastic pigment particles, including hollow plastic pigment particles, are themselves well-known in the paper industry as constituents of coating compositions. The entire content of U.S. Pat. No. 5,162,289 is hereby incorporated by reference.

Solid plastic pigments form the subject of Chapter 6 of Tappi Monograph No. 38 entitled "Paper Coating Pigments," published 1976, and are also the subject of a sub-section on pages 2073 and 2074 of "Pulp &Paper—Chemistry &Chemical Technology" edited by James P. Casey, 3rd Edition, Volume IV, published in 1976 by John Wiley &Sons. Examples of patents on plastic pigments and/or their use in paper coatings are British Patents Nos. 1229503; 1468398 and 1488554. Hollow plastic pigments and their use in paper coatings are disclosed in British Patents Nos. 1270632 and 1389122; in a paper given at the 1984 Tappi Coating Conference by C. P. Hemenway, J. J. Latimer and J. E. Young entitled "Hollow-Sphere Polymer Pigment in Paper Coating" and in an article entitled "Hollow-Sphere Pigment Improves Gloss, Printability of Paper" by W. J. Haskins and D. I. Lunde in "Pulp &Paper," May 1989 edition. Similar hollow plastic pigments are also the subject of product information literature published by Dow Chemical Company of Midland, Michigan, USA in relation to its products sold under the trade mark "Ropaque."

U.S. Pat. No. 8,536,087 discloses a thermographic substrate comprised of a thermosensitive layer, wherein the thermosensitive layer is comprised of a binder, a multiplicity of hollow sphere organic pigments, and a thermal solvent. However, U.S. Pat. No. 8,536,087 does not teach the use of elastomer based binders nor teach the use of voided elastomer or rubber foams. The entire content of U.S. Pat. No. 8,536,087 is hereby incorporated by reference.

Voided elastomer foams can act as binders for thermographic imaging elements, providing high opacity and brightness when applied over colored substrates and can be transparentized in the thermal printing process to generate the visual contrast needed for human and machine readable codes to be printed. Additionally, such voided elastomer binders have the elastic properties to recover from compressive scratches and bruises, thus improving the mechanical durability of the thermographic substrate 10 in which they are comprised.

U.S. Pat. No. 7,435,783 discloses that voided latex particles can be prepared by any of several known processes, including those described U.S. Pat. Nos. 4,427,836; 4,468,498; 4,594,363; 4,880,842; 5,494,971; 5,521,253; 5,157,084; and 5,360,827. The entire contents of U.S. Pat. Nos. 7,435,783; 4,427,836; 4,468,498; 4,594,363; 4,880,842; 5,494,971; 5,521,253; 5,157,084; and 5,360,827 are hereby incorporated by reference.

Voided latex particles, as described in the references noted above, are prepared by swelling the core of a core-shell emulsion polymer. Some of the processes, such as that described by U.S. Pat. No. 5,360,827, in the latter stages of polymerizing the shell, monomer is added to facilitate diffusion of base into the core of the polymer in order to achieve swelling. The entire content of U.S. Pat. No. 5,360,827 is hereby incorporated by reference.

Thermosensitive foam layer 401 may optionally include a colorant 202. A preferred colorant is a dye or pigment, such as the colorants 202 described in optional colorant layer 201. Additionally, colorant 202 may be an optical brightener or fluorescent dye or pigment which adds a color effect to the layer without significantly impacting the opacity of the layer.

So, for example, light stable dyes, transparent pigment dispersions and the like may be added to the layer to provide a tinting color effect once the layer has been transparentized. Such dyes or pigments may act as a light filter for the underlying color layers. Alternatively, or additionally, optical brighteners may be added to thermosensitive layer 501 to improve the apparent whiteness of unimaged areas.

Thermosensitive foam layer 401 is comprised of an elastomer binder 402 wherein the binder preferably constitutes at least 95 percent of the mass of the thermosensitive layer, and, in one embodiment, from 33 to 90 percent of mass of the layer.

Binder 402 may be comprised of elastomers which are preferably water soluble, water dispersible or water emulsifiable. Elastomers usable in the thermosensitive foam layer 401 include, e.g., polyurethanes, natural and synthetic rubbers, vinyl resins such as polyvinylacetate copolymers, copolymers of polystyrene-co-butadiene, acrylic resins such as polybutyl acrylate-co-acrylic acid, polymethylmethacrylate-co-butylacrylate, polybutylmethacrylate; polyacetal resins such as polyvinylbutyral, and the like; water dispersible acrylic resins and the like; polyester, polyamide, polycarbonate, polyurea, polyether, polyethylene glycol, polyethylene oxide, polypropylene oxide, epoxy resins and the like; silicone resins and the like, various copolymers and mixtures thereof.

In an embodiment, elastomeric binder 402 is dispersed or emulsified in water at concentrations of 25 to 75% solids, more preferable from 40 to 70% solids, most preferably from 50 to 65% solids.

In an embodiment, elastomeric binder 402 has a Tg less than 35° C., more preferably less than 30° C., most preferably has a Tg less than 0° C.

U.S. Pat. RE45747E1 discloses a wide range of acrylic and other elastomers useful for the production of foamed compositions. The entire content of U.S. Pat. RE45747E1 is hereby incorporated by reference.

U.S. Pat. No. 9,878,471 describes the use of polyurethane dispersions for the production of foam layers with good recovery from compressive stress. The entire content of U.S. Pat. No. 9,878,471 is hereby incorporated by reference.

In one embodiment, the binder comprises an ionomeric crosslinked resin. In one embodiment, the binder comprises a self-crosslinking acrylic resin.

In one embodiment, the binder comprises a cross-linked resin. In this case, a resin having several reactive groups, for example, hydroxyl or amine groups, is used in combination with a crosslinking agent, such as a polyisocyanate, glyoxal, epoxies, aldehydes, silanes, titanates, zirconate, aziridine, oxazolin and the like. Published United States Patent Application 2019/0300728A describes the use of polyisocyanate crosslinkers to increase the mechanical properties of polyurethane foams. The entire content of Published United States Patent Application 2019/0300728A is hereby incorporated by reference.

Referring again to FIG. 1, the elastomer 402 in thermosensitive foam layer 401 may be comprised of surfactant. Surfactants, also referred to as foam stabilizers, are used to reduce the surface tension of elastomer solutions or dispersions such that they can be mechanically whipped or frothed to incorporate voids into the fluid and generate foams. U.S. Pat. No. 8,476,330 describes the use of silicone base surfactants for the generation of polyurethane foams. The entire content of U.S. Pat. No. 8,476,330 is hereby incorporated by reference.

Surfactants are used as a raw material for ensuring stable foaming. One or more surfactants may be used in combination to generate a foamed elastomer comprised of voids. The amount of the surfactant is preferably 2% by weight to 60% by weight (namely, 2 parts by weight to 60 parts by weight), and particularly preferably 1% by weight to 35% by weight (namely, 1 part by weight to 35 parts by weight), provided that the amount of the elastomer dispersion is 100% by weight (namely, 100 parts by weight). When this amount of surfactant is added, suitable foaming is ensured and a fine cell structure is able to be formed. Moreover, the strength and density of the foam able to be made have suitable values by adding a suitable amount of the surfactants.

U.S. Pat. No. 10,087,277 describes the production of polyurethane foams using anionic foam stabilizers and surfactants. The fineness of the cells is able to be increased and the density of the polyurethane foam is able to be lowered (namely, pliability is able to be increased), by using the urethane emulsion and the anionic foam stabilizer. Examples of anionic foam stabilizers include sodium laurate, sodium myristate, sodium stearate, ammonium stearate, sodium oleate, potassium oleate soap, castor oil potassium soap, coconut oil potassium soap, sodium lauroyl sarcosinate, sodium myristoyl sarcosinate, sodium oleyl sarcosinate, sodium cocoyl sarcosinate, coconut oil alcohol sodium sulfate, sodium polyoxyethylene lauryl ether sulfate, sodium alkylsulfosuccinate, sodium lauryl sulfoacetate, sodium dodecylbenzenesulfonate and sodium α-olefin sulfonate, and among them ammonium stearate and sodium alkylsulfosuccinate are particularly preferable. Moreover, using both of ammonium stearate and sodium alkylsulfosuccinate as anionic foam stabilizers is preferable. The entire content of U.S. Pat. No. 10,087,277 is hereby incorporated by reference.

Published United States Patent Application 2016/0235880A1 describes the use of ethylene oxide/propylene oxide block-copolymer surfactants as stabilizers for polyurethane foams. The entire content of Published United States Patent Application 2016/0235880A1 is hereby incorporated by reference.

Referring again to FIG. 1, thermosensitive foam layer 401 is comprised of a multiplicity of particles 404. Particle 404 may be an organic or polymeric particles with an average particle size less than 5 μm and, more preferably, less than 1 μm.

Particle 404 is added to thermosensitive foam layer 401 with the function of improving the brightness and/or the transparentization of the layer during thermal printing while providing minimal masking. Particles, which mask layer 401, reduce its transparency after thermal imaging by scattering light. For example, particles such as titanium dioxide with a refractive index of 2.49 generate high masking and are not suitable for use in thermosensitive foam layer 401. Particles with small differences in refractive index to the elastomers comprised in layer 401 are preferred.

Typically elastomers such as acrylic and styrene polymers have refractive indices in the range of 1.45 to 1.55. Organic polymeric particles will have refractive indexes in the same range as elastomer 402. In addition, many inorganic particles such as clay ($Al_2Si_2O_5(OH)_4$) and microcline ($KAlSi_3O_8$) have refractive indices in the range of 1.47 to 1.55 and may be suitable for use as particle 404 in thermosensitive foam layer 401.

In an embodiment, particle 404 has a refractive index between 1.0 and 2.0. In another embodiment, particle 404 has a refractive index between 1.25 and 1.75. In yet another embodiment, particle 404 has a refractive index between 1.35 and 1.65.

Referring again to FIG. 1, thermosensitive foam layer 401 is comprised of voids 403.

Referring again to FIG. 1, optional adhesive layer 1101 is comprised of heat and/or pressure activatable materials to facilitate the adhesive bonding of thermographic barrier film 906 to thermosensitive substrate 806 in the course of lamination of the film and substrate. Pressure and heat sensitive adhesives are well known to those skilled in the art.

U.S. Pat. No. 4,668,730 discloses pressure sensitive laminating adhesives. The entire content of U.S. Pat. No. 4,668,730 is hereby incorporated by reference. Such adhesives, based on acrylic colloids are preferred. U.S. Pat. No. 4,668,730 discloses that a coatable latex adhesive having a Tg of −60° to 0° C., characterized by superior rheological properties, can be prepared without the use of additional thickeners from a colloid stabilized latex comprising: 65-90% by weight of the latex polymer solids of an acrylate or methacrylate ester monomer polymerized in 10-35% by weight of the latex solids of a polymeric colloid, the polymeric colloid having a Tg of −40° to 0° C., a number average molecular weight of 2,000 to 10,000.

Heat activatable adhesives are preferably used to laminate thermographic barrier film 906 to thermosensitive substrate 806. U.S. Pat. No. 9,181,462 discloses heat activatable adhesives which when heated above their Tg's become tacky, pressure sensitive adhesives and may be used to adhesively bond thermographic barrier film 906 to thermosensitive substrate 806. The entire content of U.S. Pat. No. 9,181,462 is hereby incorporated by reference.

U.S. Pat. No. 9,181,462 discloses an exemplary embodiment of an aqueous adhesive composition which is activatable by exposure to IR radiation and which exhibits pressure sensitive adhesive properties once activated by IR or by heating. The adhesive composition comprises (i) an emulsion base copolymer exhibiting a glass transition temperature Tg above 25° C. and a weight average molecular weight within a range of from 15,000 Daltons to 100,000 Daltons, (ii) a solid plasticizer for such copolymer exhibiting a melting point above 40° C., and (iii) a high softening point tackifier.

Referring again to FIG. 1, thermographic substrate 10 is preferably comprised of a barrier layer 601.

Barrier layer 601 is optionally applied as a contiguous coating over thermosensitive foam layer 401 and/or 501.

Alternatively and additionally, barrier layer 601 is optionally comprised of a free standing film barrier film 602 which may be coated with optional thermosensitive layer 501 and heat resistant topcoat 701 to form thermographic barrier film 906 which may then be laminated onto intermediate thermosensitive substrate 806 to form thermographic substrate 10.

Barrier layer 601 functions to protect underlying thermosensitive layers 301, 401, and/or 501 from attack by agents which could reduce the opacity of such layers. Barrier layer 601 preferably is a water-based coating composition. In addition, and in one embodiment, barrier layer 601 helps to maintain distinct layer separation between thermosensitive foam layer 401 and/or 501 and heat resistant topcoat 701.

Binders described elsewhere in this specification, such as binder 203, 302, 402, or 502 may be used in layer 601.

Barrier layer 601 is preferably crosslinked, i.e., it is insolubilized after coating so that, when it is contacted with water or organic solvent at ambient temperature it is substantially insoluble in such solvent. In one aspect of this embodiment, thermosensitive foam layer 401 also is crosslinked. Consequently, and in this embodiment, the imaged thermographic substrate is substantially insoluble in water and, thus, is resistant to attack by water. The substrate is also resistant to light fading.

In one embodiment barrier layer 601 has a density greater than 0.9 grams per cubic centimeter and, preferably, greater than 1 gram per cubic centimeter. In another embodiment, the density of such barrier layer is greater than 1.1 grams per cubic centimeter.

In one embodiment, barrier layer 601 is preferably comprised of polyvinyl alcohol. In a preferred embodiment, barrier layer 601 is comprised of a cross-linked polyvinyl alcohol.

In one embodiment, barrier layer 601 is preferably comprised of a chlorine containing polymer.

Barrier layer 601 preferably has a coating weight 606 of at least about 0.1 grams per square meter to 10 grams per square meter and, more preferably, from about 0.2 grams per square meter to 5 grams per square meter. In one embodiment, the coating weight is from 0.5 grams per square meter to 2 grams per square meter.

In one embodiment, barrier layer 601 is flood coated over the top of thermosensitive foam layer 401 and/or thermosensitive layer 501 as a protection to layer from attack by agents which include (but are not limited to) solvents, plasticizers, oils, inks, coating solutions, fingerprint oil, varnishes, adhesives and the like which might come in contact with top most surface 800 of the thermographic substrate 10. As will be apparent, the combination of a barrier layer and a thermographic layer provides a unique combination of properties, such as, protection against fading, water, organic solvents, plasticizers, oils, adhesives, etc.

Barrier layer 601 is preferably coated from water. In one embodiment, water-based compositions are prepared such that many of the components remain separated and not intimately mixed at the time of coating and drying. In one embodiment, barrier layer 601 is comprised of dispersions of binders, coalescent agents, crosslinkers, and the like.

In one embodiment, barrier layer 601 is comprised of a continuous phase crosslinked binder.

In one embodiment, barrier layer 601 is an extruded or cast polymer based barrier film 602 which is laminated to thermosensitive layers 401 or 501. Transparent, thin, polymer films or polyethylene, polypropylene, polystyrene, polycarbonate, polyester and the like are commonly available and provide thermosensitive substrate 10 with excellent resistance to water and other chemicals.

Barrier layer 601 is preferably comprised of biaxially oriented polyethylene terephthalate (PET) film. PET films have excellent dimensional and thermal stability, are highly uniform in thickness, and provide both water and chemical resistance to thermographic substrate 10.

Preferably the thickness 606 of barrier layer 601 is less than 25 micrometers, more preferably less than 12 micrometers, most preferably less than 6 micrometers.

Referring again to FIG. 1, thermographic substrate 10 is optionally comprised of a heat resistant topcoat 701. The topcoat 701 is the uppermost layer of the thermographic substrate and comes in direct contact with the thermal printhead when the thermographic substrate is imaged in a thermal printer. The thermal print head is comprised of a linear array of individual heating element. As these heating elements are energized in response to image being printed, they may reach temperatures in the range of 200° C. to about 400° C. As the thermographic substrate 10 passes beneath the thermal printhead, the topcoat 701 is in turn heated as it comes in contact with energized heating elements of the printhead. Those skilled in the art will understand that many of the binders described in this specification will soften at such temperatures and be inclined to stick or adhere to the hot printing elements.

Topcoats which are heat resistant are able to freely pass beneath an energized thermal printhead without sticking or stalling. Heat resistant topcoat 701 preferably is resistant to sticking to the thermal printhead and must enable thermographic substrate 10 to pass beneath the printhead with minimal friction, irrespective of the temperature of the printhead. Heat resistant topcoat 701 preferably should not rub off or build up on the thermal printhead as such material will interfere with the flow of heat from the printhead to the thermographic substrate 10.

In an embodiment, the coefficient of friction of the heat resistant topcoat does not increase by more than 50 percent form 20° C. to about 300° C.

Heat resistant topcoat 701 is comprised of heat resistant binder 702 and optionally one or more abrasive particles 703 and one or more lubricants 704. One may use one or more of the binders disclosed elsewhere in this specification. Additionally, U.S. Pat. No. 6,410,479 discloses binders. The entire content of U.S. Pat. No. 6,410,479 is hereby incorporated by reference.

The binder 702 for heat resistant topcoat 701 may be any composition which does not cause sticking at temperatures of 150° Celsius or higher. Binders described elsewhere in this specification, such as binders 203 or 302, may be used. In another embodiment, binder 702 has a Tg of at least 50° Celsius. In yet another embodiment binder, 702 has a glass transition temperature at least 70° C.

In an embodiment, binder 702 is a cross-linked polyvinyl alcohol. Crosslinked polyvinyl alcohol base top-coating binders have been described in U.S. Pat. No. 6,410,479. The entire content of U.S. Pat. No. 6,410,479 is hereby incorporated by reference.

Preferably, heat resistant topcoat 701 is comprised of polyvinyl alcohol. The polyvinyl alcohol use in heat resistant topcoat 701 is preferably fully saponified, partially saponified, or denatured by carboxyl, amide, sulfonic acid, or butyl aldehyde.

In one embodiment, heat resistant topcoat 701 is preferably comprised of a crosslinked binder to further improve its heat resistance and its ability not to stick to the thermal printhead. Hydroxyl containing binders, such as polyvinyl alcohol, polyurethane, polyacrylates, polyesters, polyacetals and the like, may preferably be crosslinked with dialdehydes such as glyoxal or polyaldehyde, epoxies such as diglycidyl type, dimethylolurea such as glycerindiglycidylether, isocyanates, boron oxides, aziridines, oxazolines; and the like.

Heat resistant topcoat 701 preferably protects the underlying thermosensitive layers 301, 401, and 501 from attack by plasticizer, oil, solvents and the like.

Heat resistant topcoat 701 is preferably comprised of a lubricant 704. The lubricant 704 lowers the friction of the topcoat 701 against the thermal printhead, particularly at high temperatures. Lubricants 704 may be comprised of the metallic salt of high fatty acid such as zinc stearate, zinc stearyl phosphate, calcium stearate, waxes such as paraffin, polyethylene, carnauba, and micro crystalline, silicone compounds, phosphate esters and the like.

Heat resistant topcoat 701 is preferably comprised of one or more abrasive particles 703. Abrasive particles 703 help to remove any materials which may buildup on the thermal printhead. Preferably, such abrasive particles are comprised of inorganic particles with an average particle size less than 1 μm, more preferably less than 0.5 μm, and most preferably less than 0.1 μm.

Abrasive particle 703 preferably have a melting point above 200° Celsius and, more preferably, above 300° Celsius, and, most preferably above 400° Celsius.

Abrasive particle 703 is preferably comprised of silica, alumina, titania, talc, clay, and the like.

Abrasive particle 703 preferably has a Mohs hardness less than that of the outermost glaze on the thermal printhead. In one embodiment the abrasive particle has a Mohs hardness of less than 7. In another embodiment the abrasive particle 703 has a Mohs hardness of less than 5.

The heat resistant topcoat 701 is preferably comprised of an ultraviolet (UV) cured addition polymer resin. U.S. Pat. No. 6,566,752 discloses the use of UV cured protective coatings in thermosensitive recording materials. The entire content of U.S. Pat. No. 6,566,752 is hereby incorporated by reference.

U.S. Pat. No. 4,886,744 describes suitable UV cured protective overcoats. Most free radical initiated polymerizations can be suitably cured with the use of a photoinitiator that is responsive in the UV range. These UV overcoats contain additives such as UV absorbers and light stabilizers.

Employing the UV cured coating allows for rapid drying. U.S. Pat. No. 4,886,774 discloses the use of a coating comprising the reaction product of acrylated aromatic urethane oligomers as unsaturated oligomer, tetrahydrofural methacrylate, as methacrylate oligomer and trimethylolpropane triacrylate as crosslinking monomer. The entire content of U.S. Pat. No. 4,886,774 is hereby incorporated by reference.

U.S. Pat. No. 5,158,924 describes ultraviolet curing resins which are suitable for protective coatings and include urethane resins, epoxy resins, organosiloxane resins, polyfunctional acrylate resins, melamine resins, thermoplastic resins having high softening points such as fluorine plastics, silicone resins, and polycarbonate resins. A specific example of a urethane acrylate-type UV curing resin is UNIDIC C7-157 made by Dainippon Ink & Chemicals Incorporated. The entire content of U.S. Pat. No. 5,158,924 is hereby incorporated by reference.

The heat resistant topcoat 701 is optionally applied over the barrier layer 601. The heat resistant topcoat 701 may be applied over the thermosensitive layers 401.

The heat resistant topcoat 701 preferably has a coating weight 706 of from about 0.05 to about 10.0 grams per square meter, and more preferably from about 0.1 to about 5 grams per square meter; in one embodiment, such coating weight is from 0.5 to 2.0 grams per square meter.

Referring again to FIG. 1, heat resistant topcoat 701 protects thermographic substrate 10 from damage as it passes under the printhead of a thermal printer. It must also provide a low friction surface 800 to enable smooth transport of the thermographic substrate beneath the printhead wherein the friction is relatively independent of temperature.

Heat resistant topcoats should protect the thermal printhead from excessive buildup of debris from the printing of the thermographic substrates as this can impede heat flow between the printhead and the substrate.

In an embodiment, any buildup of debris on a thermal printhead from the thermographic substrate may be easily removed by rubbing the buildup with an alcohol saturated cloth.

The abrasive characteristics of heat resistant topcoatings should be great enough to clean any buildup of debris on the thermal printhead and yet low enough to minimize wear of the printhead.

In an embodiment, 100,000 inches of thermographic substrate may be printed on a given thermal printhead without noticeable degradation to image quality.

In another embodiment, 1,000,000 inches of thermographic substrate may be printed on a given thermal printhead without noticeable degradation to image quality.

In yet another embodiment, 5,000,000 inches of thermographic substrate may be printed on a given thermal printhead without noticeable degradation to image quality.

Heat resistant topcoat 701 is preferably coated from water. In one embodiment, water-based compositions are prepared such that many of the components remain separated and not intimately mixed at the time of coating and drying.

U.S. Pat. No. 6,410,479 discloses several preferred binders for thermographic topcoatings. Any composition which does not cause sticking at the higher temperature than 200 degrees Celsius and does not hurt the thermal sensitivity and lustrous property can be used. Concretely, various kinds of polyvinyl alcohol of 200 about 2500 polymerization degree such as fully saponified polyvinyl alcohol, partially saponified polyvinyl alcohol, denatured polyvinyl alcohol e.g. polyvinyl alcohol denatured by carboxyl, polyvinyl alcohol denatured by amide, polyvinyl alcohol denatured by sulfonic acid or polyvinyl alcohol denatured by butylal (butyl aldehyde); water soluble high polymer of celluose derivatives, such as, hydroxyethyl cellulose, methyl cellulose, ethyl cellulose, carboxymethyl cellulose and acetyl cellulose and (meth)acrylic ester resin such as (meth)acrylic ester copolymer, acrylic ester and/or methacrylic ester, copolymer of styrene and/or vinyl acetate, copolymer of acrylamide/acrylic ester/methacrylic acid, copolymer of colloidal silica complex acrylic ester and copolymer of colloidal silica complex styrene/acrylic ester can be mentioned.

U.S. Pat. No. 6,410,479 discloses several crosslinking agents for use in thermographic topcoats. Concretely, dialdehyde type such as glyoxal or polyaldehyde, polyamine type such as polyethylamine, epoxy type, polyamide resin, melamine resin, diglycidyl type, dimethylolurea such as glycerindiglycidylether, further, ammonium persulfate, iron chloride, and magnesium chloride can be mentioned, however, the invention is not limited to them. Compared with a three-dimensional bridged type glyoxal cross-linking agent, since a two-dimensional bridged type glyoxal does not deteriorate the glossiness, it is useful for the preparation of excellent lustrous surface. The reason why is unclear, however, it is considered that the light scattering is generated on a micro scale when it is three-dimensionally bridged. The amount of cross-linking agent to be added can be adjusted voluntarily so as to be a fixing composition which does not cause sticking at the temperature higher than 200 degrees Celsius and, for instance, 0.05-0.3 parts can be added to 1 part of water soluble high polymer substance. The entire content of U.S. Pat. No. 6,410,479 is hereby incorporated by reference.

U.S. Pat. No. 6,410,479 discloses several preferred lubricants for use in thermographic topcoats. A slipping agent in the glossing layer or the intermediate layer of this invention, for the purpose of improving the thermal head compatibility. As a slipping agent, the slipping agents which are generally used in the conventional thermally sensitive recording medium can be used. As the concrete example, metallic salt of high fatty acid such as zinc stearate or calcium stearate and wax such as paraffin wax, polyethylene wax, carnauba wax, micro crystalline wax and acrylic type wax can be mentioned. Especially, when the thermal head compatibility is concerned, zinc stearate or calcium stearate are desirably used.

U.S. Pat. No. 7,182,532 discloses a heat resistant back-coating applied to a thin PET film. Preferably, such back-coated films may be laminated to thermographic substrate 10 as combination barrier layers 601 and heat resistant topcoats 701. The entire content of U.S. Pat. No. 7,182,532 is hereby incorporated by reference.

U.S. Pat. No. 7,182,532 discloses the back-coating may be formed by dissolving or dispersing in a binder resin containing additive such additives as a slip agent, surfactant, inorganic particles, organic particles, etc., also with a suitable solvent to prepare a coating liquid. Coating the coating liquid by means of conventional coating devices (such as Gravure coater or a wire bar) may then occur, after which the coating may be dried.

Binder resins usable in the back-coating include, e.g., cellulosic resins such as ethyl cellulose, hydroxyethylcellulose, hydroxypropylcellulose, methylcellulose, cellulose acetate, cellulose acetate butyrate, and nitrocellulose. Vinyl resins, such as polyvinylalcohol, polyvinylacetate, polyvinylbutyral, polyvinylacetal, and polyvinylpyrrolidone, also may be used. One also may use acrylic resins such as polyacrylamide, polyacrylonitrile-co-styrene, polymethylmethacrylate, and the like. One may also use polyester resins, silicone-modified or fluorine-modified urethane resins, and the like.

In one embodiment, the binder comprises a cross-linked resin. In this case, a resin having several reactive groups, for example, hydroxyl groups, is used in combination with a crosslinking agent, such as a polyisocyanate.

In one embodiment, a heat resistant topcoat 701 is prepared and applied at a coat weight of 0.05 grams per square meter. This back-coat preferably is a polydimethylsiloxane-urethane copolymer sold as SP-2200@ by the Dainichiseika of Tokyo Japan.

One may apply heat resistant layer 701 at a coating weight of from about 0.01 to about 2 grams per square meter, with a range of from about 0.02 to about 0.4 grams/square meter being preferred in one embodiment and a range of from about 0.5 to about 1.5 grams per square meter.

Thermographic substrate 10 may be imaged with thermal printers well known to those skilled in the art. One may use one or more of the direct thermal printers disclosed in U.S. Pat. Nos. 6,124,944; 6,118,467; 6,116,709; 6,103,389; 6,102,534; 6,084,623; 6,083,872; 6,082,912; and 6,078,346. The entire contents of U.S. Pat. Nos. 6,124,944; 6,118,467; 6,116,709; 6,103,389; 6,102,534; 6,084,623; 6,083,872; 6,082,912; and 6,078,346 are hereby incorporated by reference.

Digital thermal transfer printers are readily commercially available. One may use a printer identified as Zebra 140xiIII and various other thermal printers sold by Zebra Corporation.

Figure 2:
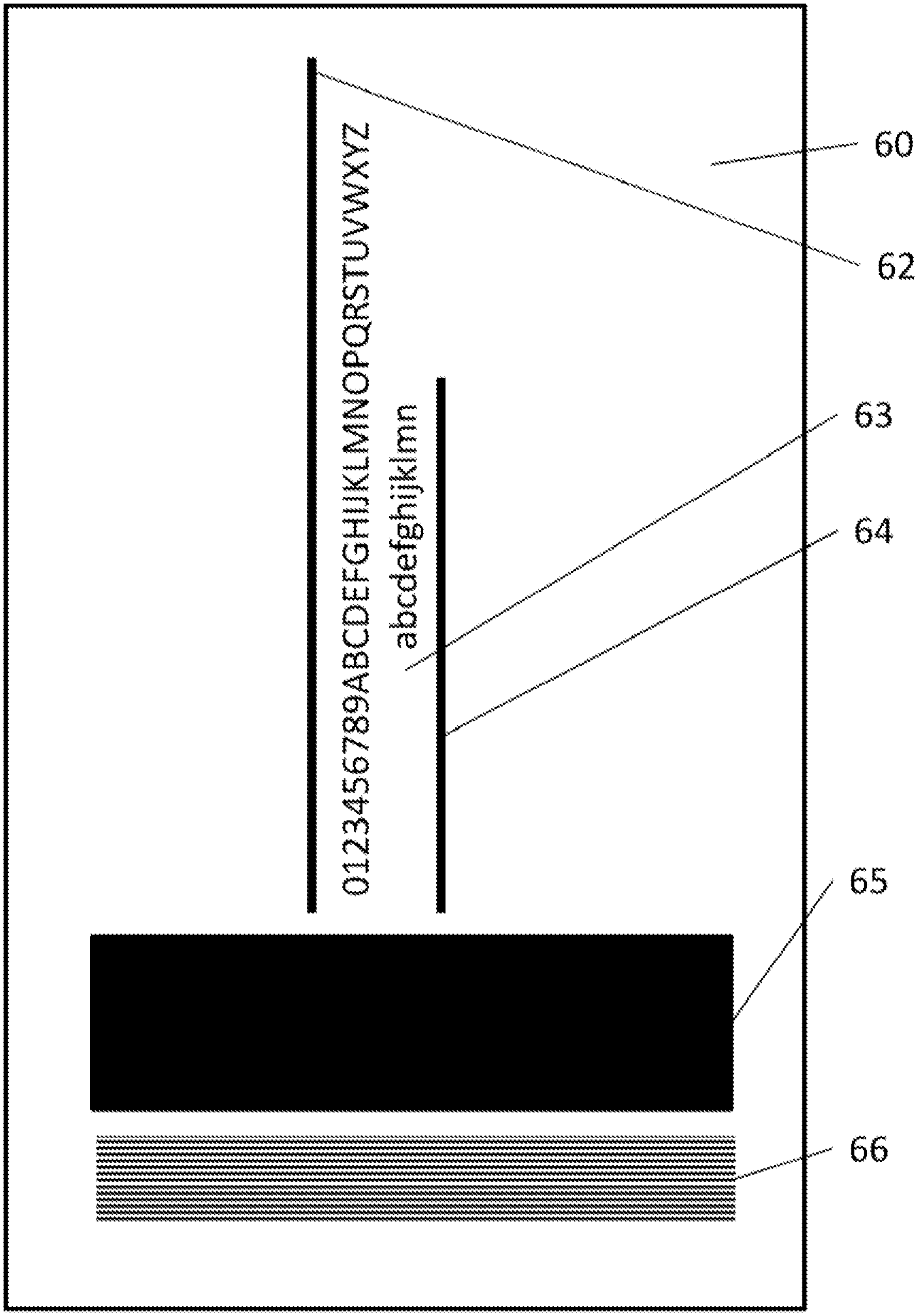
FIGS. 2 and 3 are schematic representations of two thermal printing images which may be utilized to assess the performance of thermographic substrates for image quality over the course of extended printing operations.
Figure 3:
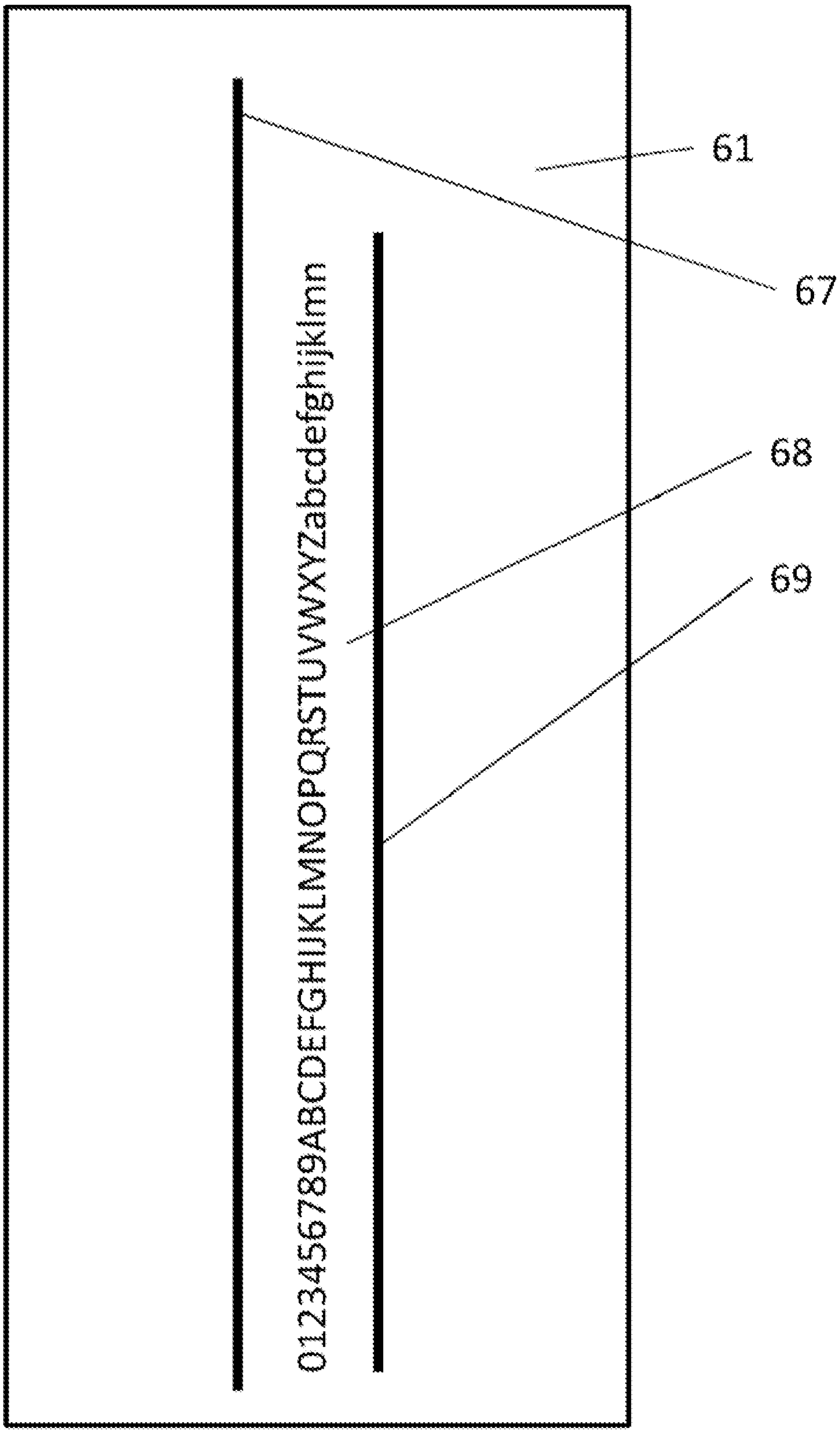

FIGS. 2 and 3 are schematic representations of two thermal printing images which may be utilized to assess the performance of thermographic substrates for image quality over the course of extended printing operations. It is known to those skilled in the art that thermographic substrates may damage a thermal printhead after repeated printing either by depositing buildup on the printhead or by excessively wearing the printhead. Such damage can impede the flow of heat between the printhead and the thermographic substrate and in extreme, completely damage one or more heating elements of the printhead.

The image 61 in FIG. 3 may be repeatedly printed onto a long length of thermographic substrate to assess the impact of repeated printing on image quality. The printed lines 67 and 69 and printed text 68 parallel to the printing direction shown in the FIG. 3 simulate extended printing under hot conditions while the unprinted areas simulate printing under cold temperatures.

Before and after such an extended printing test the image 60 in FIG. 2 may be printed to assess the impact on image quality. Image 60 is comprised on printed lines 62 and 64 and printed text 63 parallel to the printing direction and aligned relative to the print head in the same position as lines 67 and 69 and printed text 68. If repeated printing of image 61 impacts the image quality of printed thermographic substrate, then a change should be observed between the initial image quality print 60 and the final image quality print 60. In particular, if there is a degradation of the image quality of the thermographic print then uniformity of the rectangle 65 will be degraded with streaks parallel to lines 62 and 64 and the continuity of the seven lines 66 perpendicular to the print direction will be broke for image 60 shown in FIG. 2.

Figure 4:
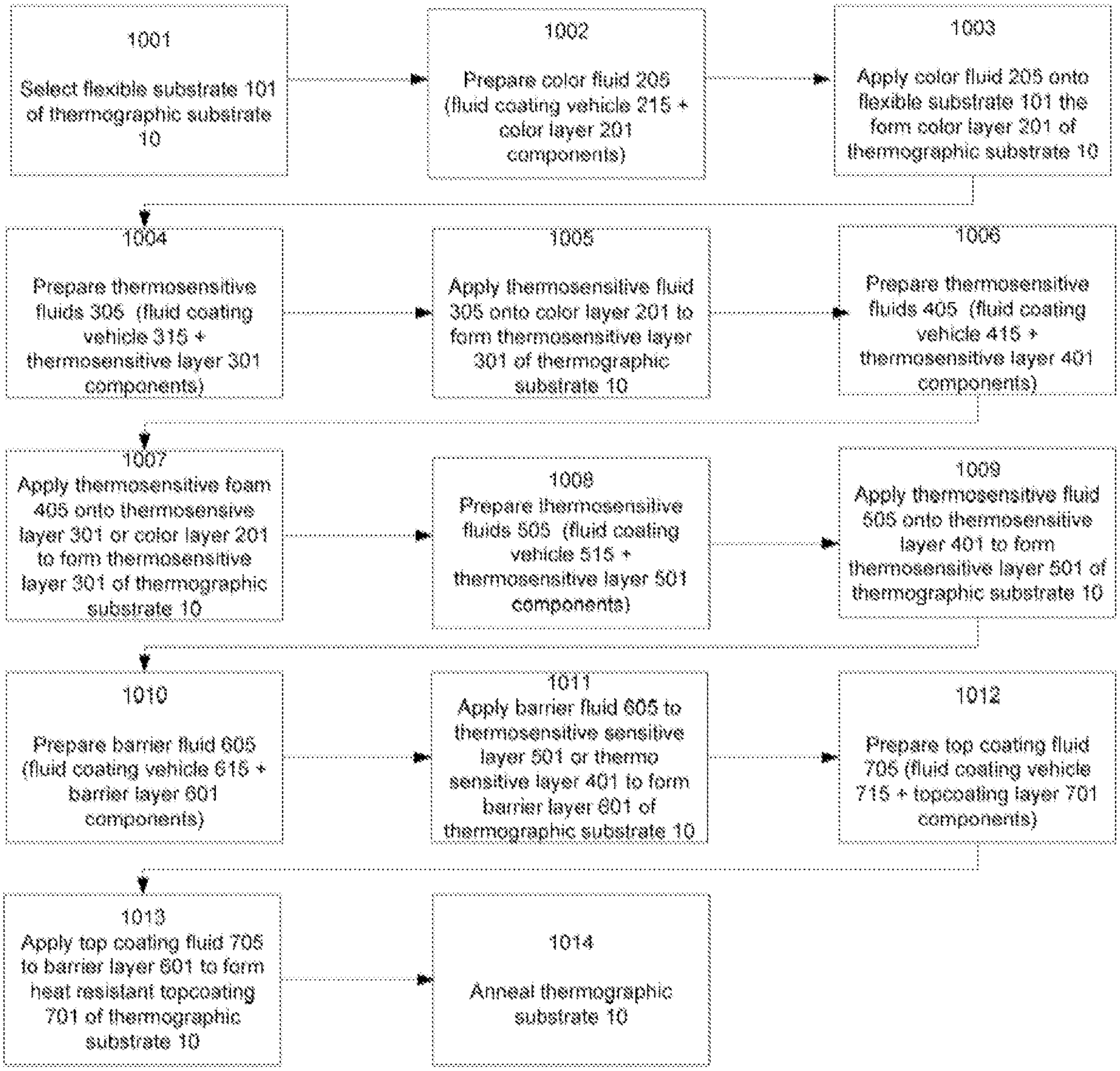
FIGS. 4 and 5 show a flowchart for preparing a thermographic substrate.

Referring to FIG. 4 which describes a process 1000 used to prepare a thermographic substrate 10. As is illustrated in FIG. 4, and in the embodiment depicted therein, in step 1001 the thermographic substrate 10 is prepared by first selecting a flexible substrate 101. The flexible substrate 101 is the base onto which the various layers of the thermographic substrate 10 will be applied.

The flexible substrate may be any of the flat, flexible supports described elsewhere in this specification including various papers and films. Step 1001 may include the treatment of the substrate 101 with corona discharge, flame, ionization or other such treatments to increase the surface energy of the substrate 101 to better facilitate wetting and adhesion of coated layers onto the substrate 101.

Referring again to FIG. 4, in step 1002 fluid 205 is prepared. This color fluid 205 is comprised of the various compounds described elsewhere in this specification for the color layer 201 and may include colorant 202, binder 203 as well as a fluid coating vehicle 215.

Fluid coating vehicle 215 may be comprised of a liquid such as water or solvent. Alternatively, the fluid coating vehicle 215 may be comprised of a wax or resin which, when heated above its melting point or glass transition temperature, becomes a fluid. The components of the color layer 201 may be mixed into the fluid coating vehicle 215. Some of the components of color layer 201 may be soluble in fluid coating vehicle 215. Such soluble components are dissolved into fluid coating vehicle 215 and such dissolution may be facilitated by heating.

In an embodiment, the fluid coating vehicle 215 is heated to a temperature which is lower than its boiling point to facilitate dissolution of a soluble component.

Some components, such as particulate matter, may be milled into the fluid coating vehicle 215 to form a particulate dispersion. Those skilled in the art will understand that milling methods may include, but are not limited to, three roll milling, grinding, ball milling, attrition, sonication, homogenization, small media milling and the like. After such milling the particulate components of the color layer 201 should have an average particle size from about 50 nm to about 10 μm.

Heated dispersions or solutions in the fluid coating vehicle 215 are preferably cooled prior to mixing with other components of the color layer 201.

In an embodiment, a defoaming additive is added to color fluid 205 to control foaming of the fluid 205.

In an embodiment, a surfactant or wetting additive is added to color fluid 205 to improve wetting of color fluid 205 onto substrate 101.

Once all of the components of the color layer 201 are mixed or milled into the fluid coating vehicle 215, they are combined together and mixed until they are homogeneously dispersed to form the color fluid 205.

Referring again to FIG. 4, in step 1003 of process 1000 the color fluid 205 is applied to flexible substrate 101. Step 1003 may use any of the commonly used coating processes known to those skilled in the art such as slot die, rotogravure coating, flexographic coating, roll coating, extrusion coating, lithographic coating, curtain coating, and the like. In addition, various printing methodologies may be used to apply the color fluid 205 to the substrate 101 including, but not limited to, ink jet printing, flexo printing, letter press printing, gravure printing, stamp printing, pad printing, and the like.

In an embodiment, the color fluid 205 is printed onto the flexible substrate 101 to form an imaged color layer 201 comprised of text, graphics, codes and the like.

In another embodiment, several different color fluids 205 are printed onto different regions of the flexible substrate 101 to form a multicolored color layer 201.

When the fluid coating vehicle 215 used to prepare the color fluid 205 is a liquid, then process 1003 to apply the color fluid 205 to the substrate 101 will include a drying step to remove the fluid coating vehicle 215 from the color fluid 205 after it has been applied to the substrate 101. Color layer 201 must be sufficiently dry so that it is no longer tacky or sticky and can be wound into a roll and resist blocking or adhering to the backside of substrate 101. Preferably, color layer 201 should contain less than about 10% of fluid coating vehicle 215 after the application and drying of process 1003.

In an embodiment, the temperature of the drier in step 1003 of process 1000 does not exceed 100° Celsius.

When the fluid coating vehicle 215 used to prepare the color fluid 205 is a wax or resin, then process 1003 to apply the color fluid 205 to the substrate 101 will heat the color fluid to a temperature above the melting point or Tg temperatures of these materials. Typically, such temperatures will be between about 50 and 200° Celsius. Process 1003 will include a cooling step to chill fluid coating vehicle 215 below its melting point or Tg temperature after the color fluid 205 has been applied to the substrate 101.

Color layer 201 must be sufficiently cooled and solidified so that it is no longer tacky or sticky and can be wound into a roll and resist blocking or adhering to the backside of substrate 101. Color layer 201 may comprise from about 30 to about 95 weight percent of the wax or resin fluid coating vehicle 215 after the application and cooling of process 1003.

The color fluid 205 may be applied with step 1003 to form a color layer 201 of various thicknesses 206. The color layer dry thickness 206 preferably has a thickness from about 0.1 μm to about 25 μm.

Referring again to FIG. 4, optional thermosensitive fluid 305 is produced in step 1004. This thermosensitive fluid 305 is comprised of the various compounds described elsewhere in this specification for the thermosensitive layer 301 and may include thermal solvents 303, binders 302 as well as a fluid coating vehicle 315. Fluid coating vehicle 315 may be comprised of a liquid such as water or solvent. In a preferred embodiment the fluid coating vehicle 315 is water. When the fluid coating vehicle is solvent, it must be a solvent which is capable of dispersing or dissolving the thermal solvent 303. The components of the thermosensitive layer 301 may be mixed into the fluid coating vehicle 315. Some of the components of thermosensitive layer 301 may be soluble in fluid coating vehicle 315. Such soluble components are dissolved into fluid coating vehicle 315 and such dissolution may be facilitated by heating.

In an embodiment, the fluid coating vehicle 315 is heated to a temperature which is lower than its boiling point to facilitate dissolution of a soluble component.

Some components, such as particulate matter, may be milled into the fluid coating vehicle 315 to form a particulate dispersion as described elsewhere in this specification.

Heated dispersions or solutions in the fluid coating vehicle 315 are preferably cooled prior to mixing with other components of the thermosensitive layer 301.

In an embodiment, dispersants are added to fluid coating vehicle 315 to assist with the dispersion of thermal solvent 303 into the vehicle 315.

In an embodiment, a viscosifier is added to thermosensitive fluid 305 to increase the viscosity of the fluid 305.

In an embodiment, a surfactant or wetting additive is added to thermosensitive fluid 305 to improve wetting of color fluid 305 onto color layer 201.

Once all of the components of the thermosensitive layer 301 are mixed or milled into the fluid coating vehicle 315, they are combined together and mixed until they are homogeneously dispersed to form the thermosensitive fluid 305.

Referring again to FIG. 3, optional step 1005 applies the thermosensitive fluid 305 to color layer 201 which in turn is applied to flexible substrate 101. The application step 1005 may use any of the commonly used coating processes known to those skilled in the art such as slot die, rotogravure coating, flexographic coating, roll coating, extrusion coating, lithographic coating, curtain coating, and the like. In addition, various printing methodologies may be used to apply the thermosensitive fluid 305 to the substrate 101 including, but not limited to, ink jet printing, flexo printing, letter press printing, gravure printing, stamp printing, pad printing, and the like.

In an embodiment, the thermosensitive fluid 305 is printed onto the color layer 201 to form an imaged thermosensitive fluid 305 comprised of text, graphics, codes and the like.

In another embodiment, several different thermosensitive fluid 305 are printed onto different regions of the color layer 201 to form a multicolored thermosensitive layer 301.

When the fluid coating vehicle 315 used to prepare the thermosensitive fluid 305 is a liquid, then step 1005 to apply the thermosensitive fluid 305 to the color layer 201 will include a drying step to remove the fluid coating vehicle 815 from the thermosensitive layer 301 after it has been applied to the color layer 201.

In an embodiment, thermosensitive layer 301 must be sufficiently dry so that it is no longer tacky or sticky and can be wound into a roll and resist blocking or adhering to the backside of substrate 101. Preferably, thermosensitive layer 301 should contain less than about 10% of fluid coating vehicle 315 after the application and drying of process 1005.

In an embodiment, the temperature of the drier in step 1005 of process 1000 does not exceed 100° Celsius.

The thermosensitive fluid 305 may be applied with step 1005 to form a thermosensitive layer 301 of various thicknesses 306. Thermosensitive layer 301 preferably has a coating weight 306 of 0.5 to 20 grams per square meter, more preferably from 1 to 10 grams per square meter.

Referring again to FIG. 4, a thermosensitive foam 405 is produced in step 1006. This thermosensitive foam 405 is comprised of the various compounds described elsewhere in this specification for the thermosensitive foam layer 401 and may include elastomeric binders 402, thermal solvents 303, particles 404, and optional colorants 202 as well as surfactants and foam stabilizers dissolved in fluid ink vehicle 415. Fluid coating vehicle 415 may be comprised of a liquid such as water or solvent.

In an embodiment the fluid coating vehicle 415 is water. The components of the thermosensitive foam layer 401 may be mixed into the fluid coating vehicle 415. Some of the components of thermosensitive foam layer 401 may be soluble in fluid coating vehicle 415. Such soluble components are dissolved into fluid coating vehicle 415.

Some components, such as particulate matter, may be milled into the fluid coating vehicle 415 to form a particulate dispersion as described elsewhere in this specification.

In an embodiment, particles 404 are added to fluid coating vehicle 415 and mixed prior to adding other components of thermosensitive foam layer 401.

Once all of the components of the thermosensitive foam layer 401 are mixed or milled into the fluid coating vehicle 415, they are mechanically whipped into a foam comprising voids 403 filled either with air or with another gas to form the thermosensitive foam 405.

Referring again to FIG. 4, step 1007 applies the thermosensitive foam 405 directly to color layer 201 or, if present, onto thermosensitive layer 301. The foam coating application step 1006 may use any of the commonly used coating processes known to those skilled in the art such as slot die, blade coating, extrusion coating, and the like.

When the fluid coating vehicle 415 used to prepare the thermosensitive foam 405 is a liquid, then step 1007 to apply the thermosensitive foam to either color layer 201 or thermosensitive layer 301, if present, will include a drying step to remove the fluid coating vehicle 415 from the thermosensitive foam layer 401 after it has been applied. Preferably, thermosensitive layer 301 should contain less than about 10% of fluid coating vehicle 415 after the application and drying of process 1007.

In an embodiment, the temperature of the drier in step 1007 of process 1000 does not exceed 150° Celsius.

In an embodiment, thermosensitive foam 405 is comprised of crosslinkers and requires additional drying time to activate and react the crosslinker with elastomeric binder 402.

The thermosensitive fluid 305 may be applied with step 1007 to form a thermosensitive foam layer 401 of various thicknesses 406. Thermosensitive foam layer 401 preferably has a thickness 406 of 25 μm to 1000 μm, more preferably from of 100 μm to 500 μm.

Referring again to FIG. 1, substrate 101, color layer 201, optional thermosensitive layer 301 and thermosensitive foam layer 401 make up intermediate thermosensitive substrate 806 which may be coated with optional thermosensitive layer 501, barrier layer 601 and heat resistant topcoat 701 or laminated with thermographic barrier film 906 made up of optional thermosensitive layer 501, barrier film 602 and heat resistant topcoat 701, the process of which will be described elsewhere in this specification.

Referring again to FIG. 4, optional thermosensitive fluid 505 is produced in step 1008. This thermosensitive fluid 505 is comprised of the various compounds described elsewhere in this specification for the thermosensitive layer 501 and may include thermal solvents 303, binders 502 as well as a fluid coating vehicle 515. Fluid coating vehicle 515 may be comprised of a liquid such as water or solvent. In a preferred embodiment the fluid coating vehicle 515 is water. When the fluid coating vehicle is solvent, it must be a solvent which is capable of dispersing or dissolving the thermal solvent 303.

The components of the thermosensitive layer 501 may be mixed into the fluid coating vehicle 515. Some of the components of thermosensitive layer 501 may be soluble in fluid coating vehicle 515. Such soluble components are dissolved into fluid coating vehicle 515 and such dissolution may be facilitated by heating.

In an embodiment, the fluid coating vehicle 515 is heated to a temperature which is lower than its boiling point to facilitate dissolution of a soluble component.

Some components, such as particulate matter, may be milled into the fluid coating vehicle 515 to form a particulate dispersion as described elsewhere in this specification.

Heated dispersions or solutions in the fluid coating vehicle 515 are preferably cooled prior to mixing with other components of the thermosensitive layer 501.

In an embodiment, dispersants are added to fluid coating vehicle 515 to assist with the dispersion of thermal solvent 503 into the vehicle 515.

In an embodiment, a viscosifier is added to thermosensitive fluid 505 to increase the viscosity of the fluid 505.

In an embodiment, a surfactant or wetting additive is added to thermosensitive fluid 505 to improve wetting of the fluid onto thermosensitive foam layer 401.

Once all of the components of the thermosensitive layer 501 are mixed or milled into the fluid coating vehicle 515, they are combined together and mixed until they are homogeneously dispersed to form the thermosensitive fluid 505.

Referring again to FIG. 4, optional step 1009 applies the thermosensitive fluid 505 to thermosensitive foam layer 401. The application step 1009 may use any of the commonly used coating processes known to those skilled in the art such as slot die, rotogravure coating, flexographic coating, roll coating, extrusion coating, lithographic coating, curtain coating, and the like. In addition, various printing methodologies may be used to apply the thermosensitive fluid 505 to the thermosensitive foam layer 401 including, but not limited to, ink jet printing, flexo printing, letter press printing, gravure printing, stamp printing, pad printing, and the like.

In an embodiment, the thermosensitive fluid 505 is printed onto the thermosensitive foam layer 401 to form an imaged thermosensitive fluid 505 comprised of text, graphics, codes and the like.

In another embodiment, several different thermosensitive fluids 505 are printed onto different regions of the thermosensitive foam layer 401 to form a multicolored thermosensitive layer 501.

When the fluid coating vehicle 515 used to prepare the thermosensitive fluid 505 is a liquid, then step 1009 to apply the thermosensitive fluid 505 to thermosensitive foam layer 401 will include a drying step to remove the fluid coating vehicle 515 from the thermosensitive layer 501 after it has been applied to thermosensitive foam layer 401.

In an embodiment, thermosensitive layer 501 must be sufficiently dry so that it is no longer tacky or sticky and can be wound into a roll and resist blocking or adhering to the backside of substrate 101. Preferably, thermosensitive layer 501 should contain less than about 10% of fluid coating vehicle 515 after the application and drying of process 1009.

In an embodiment, the temperature of the drier in step 1009 of process 1000 does not exceed 100° Celsius.

The thermosensitive fluid 505 may be applied with step 1009 to form a thermosensitive layer 501 of various thicknesses 506. Thermosensitive layer 501 preferably has a coating weight 506 of 0.5 to 20 grams per square meter, more preferably from 1 to 10 grams per square meter.

Referring again to FIG. 4, step 1010 prepares a barrier fluid 605. This barrier fluid 605 is comprised of the various compounds described elsewhere in this specification for the barrier layer 601 and may include binders as well as a fluid coating vehicle 615. Fluid coating vehicle 615 may be comprised of a liquid such as water or solvents. In a preferred embodiment the fluid coating vehicle 615 is water. The components of the barrier layer 601 may be mixed into the fluid coating vehicle 615.

Some of the components of barrier layer 601 may be soluble in fluid coating vehicle 615. Such soluble components are dissolved into fluid coating vehicle 615 and such dissolution may be facilitated by heating.

In an embodiment, the fluid coating vehicle 615 is heated to a temperature which is lower than its boiling point to facilitate dissolution of a soluble component.

Alternatively, some components, such as particulate matter, may be milled into the fluid coating vehicle 615 to form a particulate dispersion as described elsewhere in this specification.

Heated dispersions or solutions in the fluid coating vehicle 615 are preferably cooled prior to mixing with other components of the barrier layer 601

In an embodiment, a surfactant or wetting additive is added to barrier fluid 605 to improve wetting of barrier fluid 605 onto either thermosensitive foam layer 401 or thermosensitive layer 501.

Once all of the components of the barrier layer 601 are mixed or milled into the fluid coating vehicle 615, they are combined together and mixed until they are homogeneously dispersed to form the barrier fluid 605.

Referring again to FIG. 4, step 1011 applies the barrier fluid 605 to either thermosensitive foam layer 401 or thermosensitive layer 501, if present. The application step 1011 may use any of the commonly used coating processes known to those skilled in the art such as slot die, rotogravure coating, flexographic coating, roll coating, extrusion coating, lithographic coating, curtain coating, and the like. In addition, various printing methodologies may be used to apply the barrier fluid 605 to the thermosensitive foam layer 401 or thermosensitive layer 501 including, but not limited to, ink jet printing, flexo printing, letter press printing, gravure printing, stamp printing, pad printing, and the like.

When the fluid coating vehicle 615 used to prepare the barrier fluid 605 is a liquid, then step 1011 to apply the barrier fluid 605 to the thermosensitive foam layer 401 or thermosensitive layer 501 will include a drying step to remove the fluid coating vehicle 615 from the barrier layer 601 after it has been applied to the thermosensitive foam layer 401 or thermosensitive layer 501.

In an embodiment, barrier layer 601 must be sufficiently dry so that it is no longer tacky or sticky and can be wound into a roll and resist blocking or adhering to the backside of substrate 101. Preferably, barrier layer 601 should contain less than about 10% of fluid coating vehicle 615 after the application and drying of process 1011.

In an embodiment, the temperature of the drier in step 1007 of process 1000 does not exceed 100 degrees Celsius.

The barrier fluid 605 may be applied with step 1011 to form a barrier layer 601 of various thicknesses 606. Barrier layer 600 preferably has a coating weight 606 of at least about 0.1 grams per square meter to 10 grams per square meter.

Referring again to FIG. 4, step 1012 prepares a topcoating fluid 705. This coating fluid 705 is comprised of the various compounds described elsewhere in this specification for the heat resistant topcoat 701 which is comprised of heat resistant binder 702 and optionally one or more abrasive particles 703 and one or more lubricants 704 as well as a fluid coating vehicle 715. Fluid coating vehicle 715 may be comprised of a liquid such as water or solvents.

In an embodiment the fluid coating vehicle 715 is water.

Some of the components of heat resistant topcoat 701 may be soluble in fluid coating vehicle 715. Such soluble components are dissolved into fluid coating vehicle 715 and such dissolution may be facilitated by heating.

In an embodiment, the fluid coating vehicle 715 is heated to a temperature which is lower than its boiling point to facilitate dissolution of a soluble component.

Alternatively, some components, such as particulate matter, may be milled into the fluid coating vehicle 715 to form a particulate dispersion as described elsewhere in this specification.

Heated dispersions or solutions in the fluid coating vehicle 715 are preferably cooled prior to mixing with other components of the heat resistant topcoat 701.

In an embodiment, a defoaming additive is added to topcoat fluid 705 to control foaming of the fluid 705.

In an embodiment, a surfactant or wetting additive is added to topcoat fluid 705 to improve wetting of topcoat fluid 705 onto barrier layer 601.

Once all of the components of the heat resistant topcoat 701 are mixed or milled into the fluid coating vehicle 715, they are combined together and mixed until they are homogeneously dispersed to form the topcoat fluid 705.

Referring again to FIG. 4, step 1013 applies the topcoat fluid 705 to barrier layer 601 which in turn is applied to the thermosensitive layer 501, if present, or thermosensitive foam layer 401 which, in turn, is applied on thermosensitive layer 301, if present, or color layer 201 which is applied on flexible substrate 101. The application process 1012 may use any of the commonly used coating processes known to those skilled in the art such as slot die, rotogravure coating, flexographic coating, roll coating, extrusion coating, lithographic coating, curtain coating, and the like. In addition, various printing methodologies may be used to apply the topcoat fluid 705 to the barrier layer 601 including, but not limited to, ink jet printing, flexo printing, letter press printing, gravure printing, stamp printing, pad printing, and the like.

When the fluid coating vehicle 715 used to prepare the topcoat fluid 705 is a liquid, then step 1013 to apply the topcoat fluid 705 to the barrier layer 601 will include a drying step to remove the fluid coating vehicle 715 from the heat resistant topcoat 701 after it has been applied to the barrier layer 601. Heat resistant topcoat 701 must be sufficiently dry so that it is no longer tacky or sticky and can be wound into a roll and resist blocking or adhering to the backside of substrate 101. Preferably, heat resistant topcoat 701 should contain less than about 10% of fluid coating vehicle 715 after the application and drying of process 1013.

In an embodiment, the temperature of the drier in step 1013 of process 1000 does not exceed 150° Celsius.

The topcoat fluid 705 may be applied with process 1013 to form a heat resistant topcoat 701 of various thicknesses 706. Heat resistant topcoat 701 preferably has a coating weight 706 of at least about 0.05 grams per square meter to 10 grams per square meter.

The thermographic substrate assembly 10 is prepared by building up, layer over layer, on a flexible substrate 101 a color layer 201 using color fluid 205 and application step 1003, optionally a thermosensitive layer 301 using thermosensitive fluid 305 and application step 1005, a thermosensitive foam layer 401 using thermosensitive foam 405 and application step 1007, optional thermosensitive layer 501 using thermosensitive fluid 505 and application step 1009, a barrier layer 601 using barrier fluid 605 and application step 1011, and finally a heat resistant topcoat 701 using topcoat fluid 705 and application step 1013.

Referring again to FIG. 4, the thermographic substrate 10 may be thermally annealed in process 1014. Such annealing helps to consolidate the various layers of thermographic substrate 10, improving interlayer adhesion, and thermographic performance. Such annealing is preferably done at temperatures less than about 60° Celsius and for times from at least 1 minute to about 96 hours.

Figure 5:
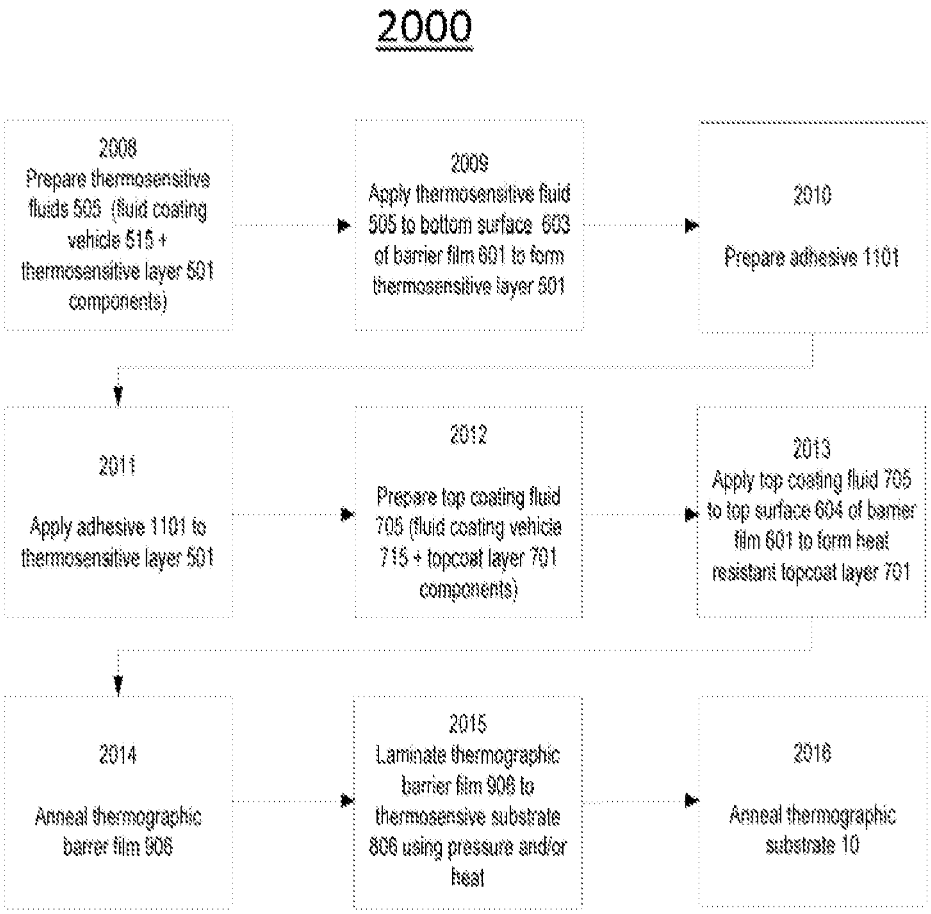

Referring to FIG. 5, process 2000 describes a process to prepare a thermographic substrate 10. As is illustrated in FIG. 5, and in the embodiment depicted therein, process 2000 is used to produce a thermographic barrier film 906. Once prepared and optimally annealed, thermographic barrier film 906 is laminated to intermediate thermosensitive substrate 806 to create a thermographic substrate 10.

Intermediate thermosensitive substrate 806 is prepared utilizing the steps 1001 to 1007 of process 1000 depicted in FIG. 4. Intermediate thermosensitive substrate 806 includes substrate 101, color layer 201, optional thermosensitive layer 301, and thermosensitive foam layer 401. Intermediate thermosensitive substrate 806 is an intermediate structure, without barrier layer 601 or heat resistant topcoat 701 and as such may not be printable in a thermal printer.

Referring again to FIG. 5 and process 2000 depicted therein, an optional thermosensitive fluid 505 is prepared in step 2008 and applied to the bottom surface 603 of a free-standing barrier film 602 in step 2009. The process for preparing optional thermosensitive fluid 505 and applying the fluid 505 to the bottom surface 603 of barrier film 602 is essentially the same as the process described in steps 1004 and 1005 of process 1000.

In an embodiment, barrier film 602 is a biaxially orientated polyethylene terephthalate film with a thickness in the range of 4.5 μm.

Referring again to FIG. 5 and process 2000 depicted therein, an optional adhesive 1101 is prepared in step 2010 and applied to thermosensitive layer 501, if present or barrier film 602 in step 2011.

Referring again to FIG. 5 and process 2000 depicted therein, a heat resistant topcoat 701 is prepared in step 2012 and applied to the top surface 604 of barrier film 602 in step 2013. The process for preparing heat resistant topcoat fluid 705 and applying the fluid 705 to the surface 604 of barrier film 602 is essentially the same as the process described in steps 1012 and 1013 of process 1000.

Referring again to FIG. 5, the thermographic barrier film 906, coated with optional thermosensitive layer 501, optional adhesive layer 1101, and heat resistant topcoat 701 may be thermally annealed in process 2014. Such annealing helps to consolidate the various layers of thermographic barrier film 906, improving interlayer adhesion and thermographic performance. Such annealing is preferably done at temperatures less than about 60° Celsius and for times from at least 1 minute to about 96 hours.

Referring again to FIG. 5, thermographic barrier film 906 and intermediate thermosensitive substrate 806 are laminated together in step 2015 using heat and/or pressure to form thermographic substrate 10. In process step 2015 the bottom surface of thermographic barrier film 603 or optional thermosensitive layer 501, if present, or optional adhesive layer 1101, if present, is laminated to the thermosensitive foam layer 401 of intermediate thermosensitive substrate 806 to form thermographic substrate 10.

Methods to laminate two substrates together are well known to those skilled in the art, see for example U.S. Pat. No. 4,069,081, which describes a method for protective film lamination. In such laminating processes two flexible substrates are brought into intimate contact in a set of nip rollers which are capable of applying controlled, uniform pressure across the width of the two substrates. The nip rollers may be heated to help adhesively bond the two substrates together.

Alternatively, the substrates may develop adhesion to each as a result of being brought together into intimate contact due only to the pressure applied as they pass through the laminating nip. In either case, the nip rollers are able to substantially eliminate air from between the substrates to provide a smooth, uniformly laminated composite substrate. The entire content of U.S. Pat. No. 4,069,081 is hereby incorporated by reference.

In an embodiment, thermographic barrier film 906 and intermediate thermosensitive substrate 806 will adhesively bond with each other when pressed into intimate contact with each other, such as in a pressurized nip roller. Alternatively and additionally, thermographic barrier film 906 and intermediate thermosensitive substrate 806 will adhesively bond with each other when heated and pressed into intimate contact with each other, such as in a heated and pressurized nip roller.

In an embodiment, thermographic barrier film 906 and/or intermediate thermosensitive substrate 806 may be coated with an adhesive 1101 to facilitate bonding between the two substrates in lamination process 2015.

In an embodiment, thermographic barrier film 906 and intermediate thermosensitive substrate 806 may be laminated together in a thermal printer. In the printer, heat applied uniformly from the thermal printhead and pressure generated by pressing the thermal printhead against both substrates and a nip roller can facilitate lamination step 2015 of process 2000 to create thermographic substrate 10.

Referring again to FIG. 5, the thermographic substrate 10 may be thermally annealed in process step 2016. Such annealing helps to consolidate the various layers of thermographic barrier film 906, improving interlayer adhesion and thermographic performance. Such annealing is preferably done at temperatures less than about 60° Celsius and for times from at least 1 minute to about 96 hours.

The following examples are not to be deemed limitative thereof. Unless otherwise specified, all temperatures are in degrees Celsius, and all parts are by weight.

Example 1

This example illustrates the preparation of a thermographic substrate (10). First a thermosensitive substrate (806) is prepared with a base polypropylene flexible substrate (sold as part number "YUPO Original FPG080" by Yupo Synthetic Papers, Chesapeake, VA) (106), a color (black) layer (206) and a thermosensitive foam layer (401). Next, a thermosensitive barrier film (906) is also prepared using a free-standing polyethylene terephthalate barrier film (602) coated with a heat resistant topcoat layer (706). Finally, the bottom surface (603) of the thermosensitive barrier film (906) is laminated to the thermosensitive foam layer (401) of the thermosensitive substrate (806). The thermographic substrate (10), when imaged on a thermal printer, produces a visually contrasting colored (white and black) image of high and low L* brightness in regions of said substrate not exposed and exposed to heat and pressure by the thermal printer, respectively.

In this example, a black pigmented nitrocellulose gravure color ink was applied to the polypropylene substrate and the solvents allowed to dry for 5 seconds at 55° C. such that the resultant ink coverage was 1.07 grams per square meter. The L* of the base substrate and the coated black layer were measured using a PIAS-II Personal Image Analysis System (as sold by Quality Engineering Associates (QEA) Inc., Billerica, MA). The L* of the base substrate was measured at 93.8. The L* of the black layer was measured at 8.8.

An opaque thermosensitive foam layer (401) having the following composition was prepared: 360 g of a 40 percent anionic aliphatic polyester-polyurethane polymer dispersion in water (known as Impranil DLH and sold by Covestro AG, Leverkusen, Germany) was added to a small mixing vessel. To this, 40 grams of a 35 percent ammonium stearate surfactant dispersion (product code 1400P from GEO Specialty Chemicals, Inc., Cedartown, GA) was added and stirred until the fluid was homogeneous.

The above mixture of resin dispersion and surfactant was added to the tempering product tank of an automated laboratory foam generator (PICO-MIX XL, sold by Hansa Industrie-Mixer GmbH & Co. KG, Stuhr, Germany). Incoming and outgoing product densities were set to 1032 and 65 grams per liter, respectively. The incoming liquid flow rate was set to 1.2 liters per hour and the mixer head speed was set to 950 RPM. The backpressure of the unit was manually controlled to be approximately 4.2 bars. Under these settings foam was generated using the composition as described above with a density of about 0.075 grams per cubic centimeter.

The foam was then applied onto the color layer side of the polypropylene film previously coated with the black gravure ink. The film was placed onto a drawdown plate fitted with a motor and applicator holder (DP-8301 model from Paul N. Gardner Company, Pompano Beach, FL). An adjustable film applicator (Micron II film applicator, also from Paul N. Gardner Company) set to 0.3 mm thickness was placed on top of the coated film. The foam was added to the cavity of the applicator and then drawn down at a rate of 5 centimeters per second. This foam coated substrate was then placed in a 60° C. oven for 5 minutes, resulting in the thermosensitive substrate (806).

A topcoat fluid was prepared and applied to a PET barrier layer as follows: Into a vessel, was added 30.37 parts 2-butanone, 18.87 parts cyclohexanone, 20.77 parts of a 25 percent solution of silicone-polyurethane copolymer (sold under the "Dia-Allomer" trademark by Dainichiseika Color & Chemicals Mfg. Co, Ltd., Tokyo, Japan) and 3.79 parts of a 50 percent solution of a polyisocyanate (known as Crossnate D-70A, also sold by Dianichiseika Color & Chemicals Mfg. Co, Ltd.) and mixed until a homogeneous fluid was obtained. This fluid was then applied using a gravure coating method onto a polyethylene terephthalate film ("Lumirror" brand as sold by Toray Plastics America, Inc., North Kingstown, RI) of 4.5μ thickness and dried with at 55° C. for 5 seconds to evaporate the solvents, leaving a crosslinked silicone-polyurethane copolymer topcoat layer of less than 0.2 μm thickness on one side (604) of the film (602) to form thermographic barrier film (906).

In this example, the thermographic barrier film (906) was laminated to the thermosensitive substrate (806) by pressing the two parts together by hand such that the non-coated side of the PET film (603) was in contact with the thermosensitive foam layer (401), resulting in the thermographic substrate (10).

This thermographic substrate was then imaged using a Zebra 140 Xi III thermal printer (Zebra Technologies, Lincolnshire, IL) at 5 centimeters per second at an energy sufficient to transparentize the thermosensitive layer and allowing the black color layer to be visible in the printed portions of the thermographic substrate (10). Measurements of L* of the imaged (dark) and non-imaged (background white) sections of the print were taken. The L* of the imaged area was 17.8 and the L* of the non-imaged area was 63.9, resulting in a ΔL* between the imaged and non-imaged areas of 46.1.

Additionally, the unimaged portion of the structure was subjected to a scratch test designed to simulate and systematize a "fingernail scratch." For this test, a stylus bearing a 538 gram weight and measuring approximately 1 mm in diameter was dragged across the surface of the unimaged (white) portion of the thermographic substrate in a sinusoidal pattern. Samples that performed well in this simulated scratch test would undergo no color change where the stylus had come in contact with the substrate. In poorly performing samples, the weight and friction of the stylus would cause a transparentization of the thermosensitive layers, allowing the black color layer to show. The sample was then subjectively graded on a scale of 1-5 with 1 being the worst (black, where contacted by the stylus) and 5 being the best (no change seen). In this example, the thermographic substrate was given a grade of 5.

Example 2

A thermosensitive substrate was prepared using the same composition and in an analogous fashion to the one prepared in Example 1.

A thermographic barrier film was prepared by coating a thermosensitive layer (501) of thermal solvent particles onto said film using the following method: a commercially available dispersion of 1,2-Bis-(3-methyl-phenoxy) ethane particles (sold as "KS-232" by Sanko Co., Ltd., Tokyo, Japan) was diluted with water and applied to the bottom surface (603) of the polyethylene terephthalate barrier film (602) using a reverse gravure coating method. The thermosensitive layer was coated onto the film and then dried for 10 seconds in a 70° C. oven. The dried thermosensitive layer had a coat weight of 1.7 grams per square meter. On the top surface (604) of the barrier film a silicone-polyurethane copolymer top-coated layer was coated in an analogous fashion to the one described in Example 1.

The thermographic barrier film of this example was then laminated to the thermosensitive substrate in an analogous fashion to that described in Example 1.

This thermographic substrate was then imaged in the same manner as Example 1. Measurements of L* of the imaged (dark) and non-imaged (background white) sections of the print were taken. The L* of the imaged area was 14.8 and the L* of the non-imaged area was 80.9, resulting in a ΔL* between the imaged and non-imaged areas of 66.1. After being subjected to the scratch test, the sample was observed and subjectively graded to have a scratch resistance level of 5.

Example 3

Example 3 was conducted in an analogous fashion to Example 2 with the exception that the dry coating weight of the thermal solvent layer on the thermographic barrier film was 2.6 grams per square meter.

This thermographic substrate was imaged in the same manner as Example 1. Measurements of L* of the imaged (dark) and non-imaged (background white) sections of the print were taken. The L* of the imaged area was 14.1 and the L* of the non-imaged area was 81.2, resulting in a ΔL* between the imaged and non-imaged areas of 67.1. After being subjected to the scratch test, the sample was observed and subjectively graded to have a scratch resistance level of 5.

Example 4

Example 4 was conducted in an analogous fashion to Example 2 with the exception that the dry coating weight of the thermal solvent layer on the thermographic barrier film was 4.3 grams per square meter.

This thermographic substrate was then imaged in the same manner as Example 1. Measurements of L* of the imaged (dark) and non-imaged (background white) sections of the print were taken. The L* of the imaged area was 13.8 and the L* of the non-imaged area was 84.8, resulting in a ΔL* between the imaged and non-imaged areas of 71.0. After being subjected to the scratch test, the sample was observed and subjectively graded to have a scratch resistance level of 5.

Example 5

This example illustrates the preparation of a thermographic substrate not comprised of a thermosensitive foam layer. A substrate comprised of a base polypropylene film and color (black) layer analogous to those used in Example 1 was prepared. The thermographic barrier film of Example 4 was used in this comparative example.

The thermographic barrier film and base polypropylene film and color (black) layer were laminated in the same manner as in Example 1, resulting in the thermographic substrate 10.

This thermographic substrate was then imaged in the same fashion as Example 1. Measurements of L* of the imaged (dark) and non-imaged (background white) sections of the print were taken. The L* of the imaged area was 11.8 and the L* of the non-imaged area was 77.4, resulting in a ΔL* between the imaged and non-imaged areas of 65.6. After being subjected to the scratch test, the sample was observed and subjectively graded to have a scratch resistance level of 5.

Example 6

This example illustrates the preparation of a thermographic substrate analogous to that of Example 1 with the exception that a thermal solvent dispersion was added to the thermal sensitive foam layer, a foam stabilizer was included, and the foam was produced in a batch wise process.

A thermosensitive foam layer was prepared: 30.90 g of Impranil DLU polyurethane dispersion was added to a small mixing vessel. To this, 4.07 grams ammonium stearate surfactant dispersion, 2.03 g of anionic sulfosuccinate foam stabilizer ("Aerosol 22 Surfactant" from Solvay USA Inc., Albright, WV) and 16.5 g of KS-232 thermal solvent dispersion was added and stirred until the fluid was homogeneous.

The thermosensitive foam was produced using the following method: to a 5-quart stainless steel mixing bowl from a KitchenAid Professional 5 Plus Series stand mixer (KitchenAid, Benton Harbor, MI) the fluid composition described above was added. The bowl was then put onto the KitchenAid mixer and the 12-wire whisk attachment was installed. The fluid was then whipped at the highest setting until such time that the density of the resulting foam was between 0.075 and 0.11 grams per cubic centimeter.

The resulting foam was then coated onto the black coated polypropylene substrate at a thickness of 0.3 mm using the method described in Example 1 to form the thermosensitive substrate of this example.

The thermographic barrier film was prepared in an analogous fashion to Example 1. This thermographic barrier film was laminated to the thermosensitive substrate (806 of this example using the method described in Example 1. The resulting thermographic substrate (10) of this example was imaged in the same manner as described in Example 1. After imaging, the L* of the imaged area measured 11.9 and the L* of the non-imaged area measured 66.2 resulting in a ΔL* between the imaged and non-imaged areas of 54.3. After being subjected to the scratch test, the sample was observed and subjectively graded to have a scratch resistance level of 4.

Example 7

This example illustrates the preparation of a thermographic substrate analogous to that of Example 4 with the exception that a polyether-polyurethane dispersion replaces the polyester-polyurethane dispersion in the thermosensitive foam layer.

A thermosensitive foam layer having the following composition was prepared: 90 parts of a 60 percent aliphatic polycarbonate-ester-polyether polyurethane aqueous polymer dispersion (known as Impranil DLU and sold by Covestro AG, Leverkusen, Germany) was added to a small mixing vessel. To this, 10 parts of the ammonium stearate surfactant dispersion was added and stirred until the fluid was homogeneous. The composition was then foamed as described in Example 1 and applied to the black flexible substrate at a thickness of 0.3 mm using the process outlined in Example 1 to form the thermosensitive substrate of this example.

The thermographic barrier film of Example 4 was laminated to the thermosensitive substrate of this example using the method described in Example 1. The resulting thermographic substrate was imaged in the same manner as described in Example 1. After imaging, the L* of the imaged area measured 17.0 and the L* of the non-imaged area measured 89.0 resulting in a ΔL* between the imaged and non-imaged areas of 72.0. After being subjected to the scratch test, the sample was observed and subjectively graded to have a scratch resistance level of 5.

Referring to Table 1 in FIG. 6 and the examples contained therein, the performance of polyurethane based thermographic substrates is demonstrated along with the synergistic effect of thermal solvents. Example 1 comprises a polyurethane based thermosensitive foam layer and no thermal solvents. The brightness of this thermosensitive substrate is low at 63.9, the thermal print sensitivity is also low with a darkness after printing of only 17.8, and the scratch resistance is excellent at 5.

Examples 2 to 4 demonstrate the effect of adding thermosensitive layer comprised of thermal solvent into the thermographic substrate. As the coating weight of the thermosensitive layer is increased, the brightness L* increases, the thermal print sensitivity increases, and the scratch remains excellent.

Example 5 demonstrates the effect of the thermosensitive layer comprised of thermal solvent alone. In this case, the brightness is not as high as in Examples 2-4, but the thermal print sensitivity and scratch resistance are excellent. However, thermographic substrates comprised of thermosensitive layers alone, such as Example 5 are prone to various thermal printing artifacts, such as uneven darkness across the printed area and unstable darkness because of recrystallization of thermal solvent over time.

Example 6 demonstrates the effect of adding the thermal solvent in the foamed thermosensitive layer. In this case, a slight increase in brightness, compared to example 1 is observed. A significant increase in thermal print sensitivity is observed along with a light reduction in scratch resistance.

Example 7 demonstrates the use of a different polyurethane binder in the foamed thermosensitive layer of the example. Comparing Examples 4 with 7, both of which comprise a thermal solvent based thermosensitive layer, Example 7 has somewhat higher brightness and somewhat less thermal print sensitivity.

Example 8

Example 8 was conducted in an analogous fashion to Example 1 with the exception that an acrylic emulsion was substituted for the aliphatic polyester-polyurethane, a foam stabilizer was included, and the foam was produced in a batch wise process.

A thermosensitive foam layer having the following composition was prepared: 62.6 g of a 40 percent heat-sealable acrylic emulsion (known as Joncryl HPB 4020 and sold by BASF SE, Ludwigschafen, Germany) was added to a small mixing vessel. To this, 8.3 grams of the ammonium stearate surfactant dispersion and 4.1 g of the anionic sulfosuccinate foam stabilizer was added and stirred until the fluid was homogeneous. This fluid composition was foamed to a density of about 0.075 grams per cubic centimeter using the method described in Example 6.

Using the method outlined in Example 1, the mixture was coated at a thickness of 0.3 mm, resulting in the thermosensitive substrate. Using the thermographic barrier film (906) from Example 1, the thermosensitive substrate was then laminated, and tested as in Example 1. After imaging, the L* of the imaged area measured 6.7 and the L* of the non-imaged area measured 72.8 resulting in a ΔL* between the imaged and non-imaged areas of 66.1. After being subjected to the scratch test, the sample was observed and subjectively graded to have a scratch resistance level of 1.

Example 9

Example 9 was prepared in an analogous fashion to Example 8 with the exception that the thermographic barrier film from Example 4 was used.

A thermosensitive substrate was prepared in an analogous fashion to the one prepared in Example 8. The thermographic barrier film of Example 4 was then laminated to the thermosensitive substrate in an analogous fashion to that described in Example 1, resulting in a thermographic substrate 10.

This thermographic substrate (10) was then imaged in the same fashion as Example 1. Measurements of L* of the imaged (dark) and non-imaged (background white) sections of the print were taken. The L* of the imaged area was 12.2 and the L* of the non-imaged area was 83.9, resulting in a ΔL* between the imaged and non-imaged areas of 71.7. After being subjected to the scratch test, the sample was observed and subjectively graded to have a scratch resistance level of 3.

Example 10

This example illustrates the preparation of a thermographic substrate comprised of a thermosensitive layer which is not foamed and does not contain voids. As in Example 1, a black color layer was coated onto the flexible polypropylene substrate with a resultant brightness L* of 8.8.

A non-voided elastomeric layer having the following composition was prepared: 20 g of Joncryl HBP 4020 acrylic emulsion was added to a small mixing vessel. To this, 10 grams of water was added and stirred until the fluid was homogeneous. Using a #10 Mayer coating rod, the fluid was coated over the top of the black color layer, and the water was dried out of the layer using room temperature blown air for 5 minutes. The resulting non-voided layer had a dry coating weight of 5.8 grams per square meter to form control thermosensitive substrate.

The thermographic barrier film of Example 4 was then laminated to the black colored polypropylene substrate coated with the non-voided elastomeric layer (806) using the same method as outlined in Example 1, resulting in a control thermographic substrate.

This control thermographic substrate was then imaged in the same fashion as Example 1. Measurements of L* of the imaged (dark) and non-imaged (background white) sections of the print were taken. The L* of the imaged area was 8.2 and the L* of the non-imaged area was 75.9, resulting in a ΔL* between the imaged and non-imaged areas of 67.7. After being subjected to the scratch test, the sample was observed and subjectively graded to have a scratch resistance level of 1.

Example 11

Example 11 was conducted in an analogous fashion to Example 8 with the exception that the foam produced was coated at a thickness of 0.4 mm.

The thermographic substrate of this example was imaged and tested in the same manner as Example 1. After imaging, the L* of the imaged area measured 8.8 and the L* of the non-imaged area measured 77.1 resulting in a ΔL* between the imaged and non-imaged areas of 68.3. After being subjected to the scratch test, the sample was observed and subjectively graded to have a scratch resistance level of 1.

Example 12

Example 12 was conducted in an analogous fashion to Example 8 with the exception that the foam produced was coated at a thickness of 0.5 mm.

The thermographic substrate of this example was imaged and tested in the same manner as Example 1. After imaging, the L* of the imaged area measured 12.8 and the L* of the non-imaged area measured 82.2 resulting in a ΔL* between the imaged and non-imaged areas of 69.4. After being subjected to the scratch test, the sample was observed and subjectively graded to have a scratch resistance level of 1.

Example 13

Example 13 was conducted in an analogous fashion to Example 10 with the exception that the thermographic barrier film of Example 1 was used.

The thermographic substrate of this example was imaged in the same manner as described in Example 1. After imaging, the L* of the imaged area measured 6.4 and the L* of the non-imaged area measured 8.0 resulting in a ΔL* between the imaged and non-imaged areas of 1.6. After being subjected to the scratch test, the sample was observed, however since there was no visible color difference between the imaged and non-imaged areas, the result could not be effectively graded.

Referring to Table 2 in FIG. 7 and the examples contained therein, an acrylic foam thermosensitive layer is demonstrated. The acrylic based thermographic substrates of Examples 8 to 13 show poor scratch resistance compared to the polyurethane substrates of Examples 1 to 7. Examples 8, 11 and 12 comprise foamed thermosensitive layers with no thermal solvent, ranging in wet foam thickness from 0.3 to 0.5 mm. The brightness of these substrate increases with increasing wet foam thickness but is overall low in these examples, while thermal print sensitivity is high. The addition of a thermal solvent based thermosensitive layer in Example 9 shows an increase in brightness with a reduction in thermal print sensitivity and an increase in scratch resistance. The solubility characteristics of the KS232 thermal solvent used in Example 9 may not be optimal for the HPB4020 acrylic elastomer.

Examples 10 and 13, with un-voided thermosensitive layers, demonstrate the difference in brightness compared to Examples 8, 11 and 12 with foamed elastomeric thermosensitive layers. The brightness of Example 13 is very low and essentially has a black appearance as the covering power of an un-voided elastomer is very low. Example 10 uses the same un-voided thermosensitive layer as Example 13 but includes a thermal solvent based thermosensitive layer. Example 10 demonstrates contribution a thermal solvent based thermosensitive layer makes to the overall brightness of the substrate.

Example 14

This example illustrates the preparation of a thermographic substrate that comprises a base paper (sold as "Unitherm LB" by Pixelle Specialty Solutions, Spring Grove, PA) (106), a color (black) layer, a thermosensitive foam layer to form a thermosensitive substrate 806. A thermographic barrier film was prepared comprising a flexible PET barrier film, and a heat resistant topcoat layer.

The color layer of Example 1 was applied in an analogous fashion to the paper substrate and the solvents allowed to dry such that the resultant ink coverage was 1.75 grams per square meter. The L* of the base paper substrate was 92.2 and the L* of the black color layer was 9.5.

A thermosensitive foam layer was prepared: 83.5 g of Impranil DLU was added to a small mixing vessel. To this, 11 grams of ammonium stearate surfactant dispersion and 5.5 g of anionic sulfosuccinate foam stabilizer was added and stirred until the fluid was homogeneous.

This mixture was foamed to a density of 0.075 grams per cubic centimeter using the method described in Example 6. The resulting foam was then coated onto the black coated paper substrate at a thickness of 0.3 mm in the same manner as Example 1 to form the thermosensitive substrate of this example. The thermographic barrier film of Example 1 was laminated to the thermosensitive substrate of this example using the method described in Example 1. The resulting thermographic substrate (10) of this example was imaged in the same fashion as described in Example 1.

After imaging, the L* of the imaged area measured 40.9 and the L* of the non-imaged area measured 84.8 resulting in a ΔL* between the imaged and non-imaged areas of 43.9. After being subjected to the scratch test, the sample was observed and subjectively graded to have a scratch resistance level of 4.

Example 15

This example illustrates the preparation of a thermographic substrate analogous to that of Example 14 with the exception that a thermal solvent dispersion was added to the thermal sensitive foam layer.

A dispersion of thermal solvent particles was prepared using the following method: 69 grams of an acrylic resin dispersion ("Joncryl HPG 296" sold by BASF SE, Ludwigschafen, Germany) is added to a small mixing vessel. To these 55 grams of water and 20 grams isopropyl alcohol on was added and stirred until the mixture was homogeneous. This mixture was placed under the head of a dispersing instrument (Ultra-Turrax T 25 basic model from IKA-Werke GmbH & Co. KG, Staufen, Germany). With the dispersing head rotating at a low speed, 100 grams of glycerol tribenzoate (available from MilliporeSigma, St. Louis, MO) was slowly added to the mixture. Once all of the powder was incorporated, the mixture was placed in the product inlet funnel of a laboratory-sized bead mill (Model M100 Mini Mill manufactured by Engineered Mills, Inc., Grayslake, IL) and milled such that the particle size distribution of the thermal solvent (as measured using a laser-scattering particle size distribution analyzer such as the Partica LA-950 by Horiba Instruments Incorporated, Irvine, CA) was measured to have a D50 of less than 4 micrometers.

A thermosensitive foam layer was prepared: 30.90 g of Impranil DLU polyurethane dispersion was added to a small mixing vessel. To this, 4.07 grams ammonium stearate surfactant dispersion, 2.03 g of anionic sulfosuccinate foam stabilizer and 16.5 g of glycerol tribenzoate dispersion of the above composition was added and stirred until the fluid was homogeneous.

This fluid composition was foamed to a density of about 0.075 grams per cubic centimeter using the method described in Example 6. The resulting foam was then coated onto the black color layer of the paper substrate as prepared in Example 14 at a thickness of 0.3 mm using the method described in Example 1 to form the thermosensitive substrate of this example.

The thermographic barrier film of Example 1 was laminated to the thermosensitive substrate of this example using the method described in Example 1. The resulting thermographic substrate of this example was imaged in the same manner as described in Example 1. After imaging, the L* of the imaged area measured 27.4 and the L* of the non-imaged area measured 79.5 resulting in a ΔL* between the imaged and non-imaged areas of 52.1. After being subjected to the scratch test, the sample was observed and subjectively graded to have a scratch resistance level of 2.

Example 16

Example 16 was conducted in an analogous fashion to Example 15 with the exception that a thermal solvent dispersion containing methyl 3,4-dimethoxybenzoate was used.

A thermal solvent particle dispersion was prepared in an analogous fashion to Example 15 with the exception that the glycerol tribenzoate particles were replaced with methyl 3,4-dimethoxybenzoate (available from TCI America, Portland, OR), 80 grams of a 15% solid aqueous solution of polyvinyl alcohol (known as "Selvol 15-103 SLTN" as sold by Sekisui Specialty Chemicals America, LLC, Dallas, TX) was used as the dispersing resin, 1 gram of the ammonium stearate dispersion was included, only grams of water was added and the isopropyl alcohol was omitted. The particles were milled such that the particle size distribution was measured to have a D50 of less than 84 micrometers.

A thermosensitive foam layer was prepared in an analogous fashion to Example 15. The thermographic barrier film of Example 1 was laminated to the thermosensitive substrate of this example using the method described in Example 1. The resulting thermographic substrate was imaged in the same manner as described in Example 1.

After imaging, the L* of the imaged area measured 54.9 and the L* of the non-imaged area measured 87.7 resulting in a ΔL* between the imaged and non-imaged areas of 32.8. After being subjected to the scratch test, the sample was observed and subjectively graded to have a scratch resistance level of 3.

Example 17

Example 17 was conducted in an analogous fashion to Example 15 with the exception that a thermal solvent dispersion containing diphenyl sulfoxide was used.

A thermal solvent particle dispersion was prepared in an analogous fashion to Example 15 with the exception that the glycerol tribenzoate particles were replaced with 50 grams diphenyl sulfoxide (available from TCI America, Portland, OR), 100 grams of Selvol 15-103 was used as the dispersing resin, 1 gram of the ammonium stearate dispersion was used, only 25 grams of water was added, and the isopropyl alcohol was omitted. The particles were milled such that the particle size distribution was measured to have a D50 of less than 35 micrometers.

A thermosensitive foam layer was prepared in an analogous fashion to Example 15. The thermographic barrier film of Example 1 was laminated to the thermosensitive substrate of this example using the method described in Example 1. The resulting thermographic substrate of this example was imaged in the same manner as described in Example 1. After imaging, the L* of the imaged area measured 75.3 and the L* of the non-imaged area measured 90.8 resulting in a ΔL* between the imaged and non-imaged areas of 15.5. After being subjected to the scratch test, the sample was observed and subjectively graded to have a scratch resistance level of 1.

Example 18

Example 10 was conducted in an analogous fashion to Example 15 with the exception that a thermal solvent dispersion containing methyl 2-benzoylbenzoate was used.

A thermal solvent particle dispersion was prepared in an analogous fashion to Example 15 with the exception that the glycerol tribenzoate particles were replaced with methyl 2-benzoylbenzoate (available from MilliporeSigma, St. Louis, MO), 75 grams of the dispersing resin was used, and 73 grams of water and 21 grams of isopropyl alcohol were added. The particles were milled such that the particle size distribution was measured to have a D50 of less than 3 micrometers.

A thermosensitive foam layer was prepared in an analogous fashion to Example 15. The thermographic barrier film of Example 1 was laminated to the thermosensitive substrate of this example using the method described in Example 1. The resulting thermographic substrate of this example was imaged in the same manner as described in Example 1. After imaging, the L* of the imaged area measured 41.6 and the L* of the non-imaged area measured 86.2 resulting in a ΔL* between the imaged and non-imaged areas of 44.6. After being subjected to the scratch test, the sample was observed and subjectively graded to have a scratch resistance level of 1.

Example 19

Example 19 was conducted in an analogous fashion to Example 15 with the exception that a thermal solvent dispersion containing bis[(4-methylphenyl)methyl] oxalate was used.

A thermal solvent particle dispersion was prepared in an analogous fashion to Example 15 with the exception that the glycerol tribenzoate particles were replaced with bis[(4-methylphenyl)methyl] oxalate (sold as "Mosathermos 298" by UFC Corporation, Taipei, Taiwan), 75 grams of Selvol 15-103 was used as the dispersing resin, 1.5 grams of the ammonium stearate dispersion and 75 grams of water was added, and the isopropyl alcohol was omitted. The particles were milled such that the particle size distribution was measured to have a D50 of less than 0.2 micrometers.

A thermosensitive foam layer was prepared in an analogous fashion to Example 15. The thermographic barrier film of Example 1 was laminated to the thermosensitive substrate of this example using the method described in Example 1. The resulting thermographic substrate of this example was imaged in the same manner as described in Example 1.

After imaging, the L* of the imaged area measured 10.8 and the L* of the non-imaged area measured 76.4 resulting in a ΔL* between the imaged and non-imaged areas of 65.6. After being subjected to the scratch test, the sample was observed and subjectively graded to have a scratch resistance level of 2.

Example 20

Example 20 was conducted in an analogous fashion to Example 15 with the exception that a thermal solvent dispersion containing dibenzyl oxalate was used.

A thermal solvent particle dispersion was prepared in an analogous fashion to Example 15 with the exception that the glycerol tribenzoate particles were replaced with dibenzyl oxalate (available from MilliporeSigma, St. Louis, MO) and 75 grams of the dispersing resin was used. The particles were milled such that the particle size distribution was measured to have a D50 of less than 0.25 micrometers.

A thermosensitive foam layer was prepared in an analogous fashion to Example 15. The thermographic barrier film of Example 1 was laminated to the thermosensitive substrate of this example using the method described in Example 1. The resulting thermographic substrate of this example was imaged in the same manner as described in Example 1. After imaging, the L* of the imaged area measured 17.8 and the L* of the non-imaged area measured 84.0 resulting in a ΔL* between the imaged and non-imaged areas of 66.2. After being subjected to the scratch test, the sample was observed and subjectively graded to have a scratch resistance level of 3.

Example 21

Example 21 was conducted in an analogous fashion to Example 15 with the exception that a thermal solvent dispersion containing bis(4-chlorobenzyl) oxalate was used.

A thermal solvent particle dispersion was prepared in an analogous fashion to Example 15 with the exception that the glycerol tribenzoate particles were replaced with bis(4-chlorobenzyl) oxalate (sold as "Mosathermos 339" by UFC Corporation, Taipei, Taiwan), 75 grams of the dispersing resin was used, and 65 grams of water was added. The particles were milled such that the particle size distribution was measured to have a D50 of less than 0.2 micrometers.

A thermosensitive foam layer was prepared in an analogous fashion to Example 15. The thermographic barrier film of Example 1 was laminated to the thermosensitive substrate of this example using the method described in Example 1. The resulting thermographic substrate of this example was imaged in the same manner as described in Example 1. After imaging, the L* of the imaged area measured 28.6 and the L* of the non-imaged area measured 86.0 resulting in a ΔL* between the imaged and non-imaged areas of 57.4. After being subjected to the scratch test, the sample was observed and subjectively graded to have a scratch resistance level of 3.

Example 22

Example 22 was conducted in an analogous fashion to Example 15 with the exception that a thermal solvent dispersion containing 1,2-diphenoxy ethane was used.

A thermosensitive foam layer was prepared in an analogous fashion to Example 15 with the exception that the glycerol tribenzoate dispersion was replaced with a commercially available dispersion of 1,2-diphenoxy ethane dispersion (sold as "KS-235" by Sanko Co., Ltd., Tokyo, Japan). This fluid composition was foamed to a density of about 0.075 grams per cubic centimeter using the method described in Example 6. The resulting foam was then coated onto the black color layer of the paper substrate as prepared in Example 14 at a thickness of 0.3 mm using the method described in Example 1 to form the thermosensitive substrate of this example.

The thermographic barrier film of Example 1 was laminated to the thermosensitive substrate of this example using the method described in Example 1. The resulting thermographic substrate of this example was imaged in the same manner as described in Example 1.

After imaging, the L* of the imaged area measured 7.8 and the L* of the non-imaged area measured 83.2 resulting in a ΔL* between the imaged and non-imaged areas of 75.4. After being subjected to the scratch test, the sample was observed and subjectively graded to have a scratch resistance level of 3.

Example 23

Example 22 was conducted in an analogous fashion to Example 15 with the exception that a thermal solvent dispersion containing 1,2-Bis-(3-methyl-phenoxy) ethane was used.

A thermosensitive foam layer was prepared in an analogous fashion to Example 15 with the exception that the glycerol tribenzoate dispersion was replaced with a commercially available dispersion of 1,2-Bis-(3-methyl-phenoxy) ethane dispersion (sold as "KS-232" by Sanko Co., Ltd., Tokyo, Japan). This fluid composition was foamed to a density of about 0.075 grams per cubic centimeter using the method described in Example 6. The resulting foam was then coated onto the black color layer of the paper substrate as prepared in Example 14 at a thickness of 0.3 mm using the method described in Example 1 to form the thermosensitive substrate of this example.

The thermographic barrier film of Example 1 was laminated to the thermosensitive substrate of this example using the method described in Example 1. The resulting thermographic substrate of this example was imaged in the same fashion as Example 1. After imaging, the L* of the imaged area measured 7.9 and the L* of the non-imaged area measured 85.7 resulting in a ΔL* between the imaged and non-imaged areas of 77.8. After being subjected to the scratch test, the sample was observed and subjectively graded to have a scratch resistance level of 4.

Example 24

Example 24 was conducted in an analogous fashion to Example 15 with the exception that a thermal solvent dispersion containing neopentyl glycol dibenzoate was used.

A thermal solvent particle dispersion was prepared in an analogous fashion to Example 15 with the exception that the glycerol tribenzoate particles were replaced with neopentyl glycol dibenzoate (sold as "Uniplex 512" by Lanxess AG, Cologne, Germany), 75 grams of the dispersing resin was used, and 65 grams of water and 5.6 grams of a polyacrylate-based non-associative thickener ("Borchi Gel A LA" from Borchers Americas, Inc., Westlake, OH) was added. The particles were milled such that the particle size distribution was measured to have a D50 of less than 2 micrometers.

A thermosensitive foam layer was prepared in an analogous fashion to Example 15. The thermographic barrier film of Example 1 was laminated to the thermosensitive substrate of this example using the method described in Example 1. The resulting thermographic substrate of this example was imaged in the same manner as described in Example 1. After imaging, the L* of the imaged area measured 25.1 and the L* of the non-imaged area measured 81.8 resulting in a ΔL* between the imaged and non-imaged areas of 56.7. After being subjected to the scratch test, the sample was observed and subjectively graded to have a scratch resistance level of 1.

Example 25

Example 25 was conducted in an analogous fashion to Example 15 with the exception that a thermal solvent dispersion containing benzyl 2-naphthyl ether was used.

A thermal solvent particle dispersion was prepared in an analogous fashion to Example 15 with the exception that the glycerol tribenzoate particles were replaced with benzyl 2-naphthyl ether (available from TCI America, Portland, OR). The particles were milled such that the particle size distribution was measured to have a D50 of less than 20 micrometers.

A thermosensitive foam layer was prepared in an analogous fashion to Example 15. The thermographic barrier film of Example 1 was laminated to the thermosensitive substrate of this example using the method described in Example 1. The resulting thermographic substrate of this example was imaged in the same manner as described in Example 1.

After imaging, the L* of the imaged area measured 27.9 and the L* of the non-imaged area measured 86 resulting in a ΔL* between the imaged and non-imaged areas of 58.1. After being subjected to the scratch test, the sample was observed and subjectively graded to have a scratch resistance level of 3.

Referring to Table 3 in FIG. 8 and the examples contained therein, the effect of the thermal solvent solubility characteristics, expressed as Log P, is demonstrated in a foamed polyurethane thermosensitive layer. Example 14 demonstrates the brightness, thermal print sensitivity, and scratch resistance of the foamed DLU polyurethane thermosensitive layer without the addition of thermal solvent. Examples 15 to 25 demonstrate the effect of adding various thermal solvents, ranging from Log P of 1.52 to 5.2, to the foamed DLU thermosensitive layer. While the Log P of the DLU polyurethane is not known directly, it can be inferred that it is approximately in the range of 3 to 5. These examples show market improvement in thermal print sensitivity with some black L* values below 10 and Brightness L* values above 80, providing excellent print contrast. Compared to Example 14, all of these examples, except for 23, show somewhat lower scratch resistance. Not wishing to be bound to any particular theory, certain thermal solvents like DPS and Uniplex 512 may partially dissolve into the foamed elastomer of these examples in the unprinted state, causing a plasticization effect which lowers the scratch resistance of their foamed thermosensitive layer.

Example 26

Example 26 was conducted in an analogous fashion to Example 14 with the exception that a polyester-polyurethane dispersion replaces the polyether-polyurethane dispersion in the thermosensitive foam layer.

A thermosensitive foam layer of the same composition in Example 1 was prepared using the method outlined in Example 6. This foam was then coated onto the base color layer of this example using the method outlined in Example 1, forming the thermosensitive substrate.

The thermographic barrier film was prepared in an analogous fashion to Example 1. This thermographic barrier film was laminated to the thermosensitive substrate of this example using the method described in Example 1. The resulting thermographic substrate of this example was imaged in the same manner as described in Example 1.

After imaging, the L* of the imaged area measured 14.6 and the L* of the non-imaged area measured 58.4 resulting in a ΔL* between the imaged and non-imaged areas of 43.8. After being subjected to the scratch test, the sample was observed and subjectively graded to have a scratch resistance level of 5.

Example 27

Example 27 was conducted in an analogous fashion to Example 26 with the exception that the thermographic barrier film was prepared comprising a thermosensitive layer of bis[(4-methylphenyl)methyl] oxalate thermal solvent particles.

The thermographic substrate of this example was imaged in the same manner as described in Example 1. After imaging, the L* of the imaged area measured 12.6 and the L* of the non-imaged area measured 80.0 resulting in a ΔL* between the imaged and non-imaged areas of 67.4. After being subjected to the scratch test, the sample was observed and subjectively graded to have a scratch resistance level of 5.

Example 28

Example 28 was conducted in an analogous fashion to Example 27 with the exception that the composition of the thermosensitive foam layer included a high $T_g$ acrylic emulsion.

A thermosensitive foam layer was prepared: 60 parts of Impranil DLH polyurethane dispersion was added to a small mixing vessel. To this, 10 parts of ammonium stearate surfactant dispersion and 30 parts of a high $T_g$ acrylic emulsion ("Joncryl 633" sold by BASF SE, Ludwigschafen, Germany) was added and stirred until the fluid was homogeneous. This mixture was foamed to a density of 0.075 grams per cubic centimeter using the method described in Example 1. The resulting foam was then coated onto the black coated paper substrate at a thickness of 0.3 mm using the method described in Example 1 to form the thermosensitive substrate of this example.

The thermographic substrate of this example was imaged in the same manner as described in Example 1. After imaging, the L* of the imaged area measured 7.6 and the L* of the non-imaged area measured 87.3 resulting in a ΔL* between the imaged and non-imaged areas of 79.7. After being subjected to the scratch test, the sample was observed and subjectively graded to have a scratch resistance level of 4.5.

Example 29

Example 29 was conducted in an analogous fashion to Example 27 with the exception that the composition of the thermosensitive foam layer had an increased level of high $T_g$ acrylic emulsion.

A thermosensitive foam layer was prepared: 45 parts of Impranil DLH polyurethane dispersion was added to a small mixing vessel. To this, 10 parts of ammonium stearate surfactant dispersion and 45 parts of high $T_g$ acrylic emulsion Joncryl 633 was added and stirred until the fluid was homogeneous. This mixture was foamed to a density of 0.075 grams per cubic centimeter using the method described in Example 1. The resulting foam was then coated onto the black coated paper substrate at a thickness of 0.3 mm using the method described in Example 1 to form the thermosensitive substrate (806) of this example.

The thermographic substrate of this example was imaged in the same manner as described in Example 1. After imaging, the L* of the imaged area measured 10.7 and the L* of the non-imaged area measured 89.4 resulting in a ΔL* between the imaged and non-imaged areas of 78.7. After being subjected to the scratch test, the sample was observed and subjectively graded to have a scratch resistance level of 3.5.

Example 30

Example 30 was conducted in an analogous fashion to Example 27 with the exception that the composition of the thermosensitive foam layer had an increased level of high $T_g$ acrylic emulsion.

A thermosensitive foam layer was prepared: 30 parts of Impranil DLH polyurethane dispersion was added to a small mixing vessel. To this, 10 parts of ammonium stearate surfactant dispersion and 60 parts of high $T_g$ acrylic emulsion Joncryl 633 was added and stirred until the fluid was homogeneous. This mixture was foamed to a density of 0.075 grams per cubic centimeter using the method described in Example 1. The resulting foam was then coated onto the black coated paper substrate at a thickness of 0.3 mm using the method described in Example 1 to form the thermosensitive substrate of this example.

The thermographic substrate of this example was imaged in the same manner as described in Example 1. After imaging, the L* of the imaged area measured 13.6 and the L* of the non-imaged area measured 90.4 resulting in a ΔL* between the imaged and non-imaged areas of 76.8. After being subjected to the scratch test, the sample was observed and subjectively graded to have a scratch resistance level of 3.5.

Example 31

Example 31 was conducted in an analogous fashion to Example 27 with the exception that the thermosensitive foam layer was comprised of Joncryl 633.

A thermosensitive foam layer was prepared: 83.5 parts of high $T_g$ acrylic emulsion Joncryl 633 was added to a small mixing vessel. To this, 11 parts of ammonium stearate surfactant dispersion and 5.5 parts anionic sulfosuccinate foam stabilizer was added and stirred until the fluid was homogeneous. This mixture was foamed to a density of 0.075 grams per cubic centimeter using the method described in Example 6. The resulting foam was then coated onto the black coated paper substrate at a thickness of 0.3 mm using the method described in Example 1 to form the thermosensitive substrate of this example.

The thermographic substrate of this example was imaged in the same manner as described in Example 1. After imaging, the L* of the imaged area measured 44.9 and the L* of the non-imaged area measured 92.8 resulting in a ΔL* between the imaged and non-imaged areas of 47.9. After being subjected to the scratch test, the sample was observed and subjectively graded to have a scratch resistance level of 2.

Example 32

Example 32 was conducted in an analogous fashion to Example 31 with the exception that the thermographic barrier film of Example 1 was used.

The thermographic substrate of this example was imaged in the same manner as described in Example 1. After imaging, the L* of the imaged area measured 23.5 and the L* of the non-imaged area measured 87.7 resulting in a ΔL* between the imaged and non-imaged areas of 64.2. After being subjected to the scratch test, the sample was observed and subjectively graded to have a scratch resistance level of 2.

Referring to Table 4 in FIG. 9 and the examples contained therein, the effect of Tg on foamed thermosensitive layers is demonstrated. Examples 26 and 27 show the performance of DLH polyurethane elastomer based foamed thermosensitive layers, with and without a thermal solvent based thermosensitive layer. The DLH polyurethane elastomer has a Tg of ~−37° C. Example 27 shows the improvement in brightness L* and thermal print sensitivity blackness L* over Example 26. Both examples have excellent scratch resistance.

Referring again to Table 4, Examples 31 and 32 show the performance of thermoplastic, styrene-acrylic copolymer, Joncryl 633, foamed thermosensitive layers, with and without a thermal solvent based thermosensitive layer. The Joncryl 633 thermoplastic has a Tg of 104° C. Both examples have high brightness L*. Example 32 shows the improvement in thermal print sensitivity blackness L* over Example 31. However, both examples have very poor scratch resistance.

Referring again to Table 4, Examples 28 to 30 show the effect of blending the thermoplastic Joncryl 633 with the DLH elastomer. As more Joncryl 633 is blended in, the Brightness L* increases while the scratch resistance decreases.

A thermographic substrate comprises a flexible substrate; a color layer; and a thermosensitive layer; the color layer being between the flexible substrate and the thermosensitive layer; the thermosensitive layer being comprised of an elastomer and voids; the thermosensitive layer being transparentizable in response to heat and pressure being applied thereto.

The L* brightness of the unprinted substrate may be >50. The L* brightness of the thermally printed substrate may be <50. The difference in L* brightness between the unprinted and thermally printed substrate may be >20. The elastomer may have a glass transition temperature <35° C. The thermosensitive layer may have a density <0.9 g/cc. The color layer may be comprised of a pigment. The thickness of the thermosensitive layer may be <1 mm. The average diameter of the voids may be <250 micrometers. The thermosensitive layer may be comprised of a surfactant. The surfactant may be ammonium stearate. The substrate may be comprised of a thermal solvent. The substrate may further comprise a second thermosensitive layer. The second thermosensitive layer may be comprised of a thermal solvent. The Log P of the thermal solvent may be within 5 units of the Log P of the elastomer.

A process for making a thermographic substrate comprises (a) overcoating a color layer onto a flexible substrate and (b) overcoating a first thermosensitive layer onto the color layer, the first thermosensitive layer being comprised of an elastomer and voids, the first thermosensitive layer being transparentizable in response to heat and pressure being applied thereto.

The process may further comprise (c) overcoating a thermosensitive foam layer onto the first thermosensitive layer and (d) overcoating a second thermosensitive layer onto the thermosensitive foam layer. The process may further comprise (c) overcoating a thermosensitive foam layer onto the first thermosensitive layer and (d) securing a second thermosensitive layer onto the thermosensitive foam layer using an adhesive layer. The process may further comprise (e) securing a barrier film to the second thermosensitive layer and (f) overcoating a heat resistant topcoat onto the barrier film. The L* brightness of the unprinted substrate may be >50. The L* brightness of the thermally printed substrate may be <50. The difference in L* brightness between the unprinted and thermally printed substrate may be >20. The elastomer may have a glass transition temperature <35° C. The thermosensitive layer may have a density <0.9 g/cc. The color layer may be comprised of a pigment. The thickness of the thermosensitive layer may be <1 mm. The average diameter of the voids may be <250 micrometers. The thermosensitive layer may be comprised of a surfactant. The surfactant may be ammonium stearate. The substrate may be comprised of a thermal solvent. The Log P of the thermal solvent may be within 5 units of the Log P of the elastomer.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above.

What is claimed is:

1. A thermographic substrate comprising:

a flexible substrate;

a color layer;

a thermosensitive layer; and a thermosensitive foam layer;

said color layer being between said flexible substrate and said thermosensitive layer;

said thermosensitive layer being between said color layer and said thermosensitive foam layer;

said thermosensitive layer including a binder and a thermal solvent;

said thermosensitive foam layer including an elastomer binder, polymer particles, and voids;

said thermosensitive foam layer being transparentizable in response to heat and pressure being applied thereto.

2. The thermographic substrate as claimed in claim 1, wherein when the thermographic substrate is unprinted, the L* brightness is >50.

3. The thermographic substrate as claimed in claim 1, wherein when the thermographic substrate is printed, the L* brightness is <50.

4. The thermographic substrate as claimed in claim 1, wherein a difference in L* brightness between when the thermographic substrate is unprinted and when the thermographic substrate is printed is >20.

5. The thermographic substrate as claimed in claim 1, wherein the elastomer binder has a glass transition temperature <35° C.

6. The thermographic substrate as claimed in claim 1, wherein the thermosensitive foam layer has a density <0.9 g/cc.

7. The thermographic substrate as claimed in claim 1, wherein the color layer is comprised of a pigment.

8. The thermographic substrate as claimed in claim 1, wherein the thickness of the thermosensitive foam layer is <1 mm.

9. The thermographic substrate as claimed in claim 1, wherein the average diameter of the voids is <250 micrometers.

10. The thermographic substrate as claimed in claim 1, further comprising:

a second thermosensitive layer; and an adhesive layer;

said adhesive layer being between said thermosensitive foam layer and said second thermosensitive layer.

11. The thermographic substrate as claimed in claim 10, further comprising:

a barrier layer; and a heat resistant topcoat;

said barrier layer being between said second thermosensitive layer and said heat resistant topcoat.

12. The thermographic substrate as claimed in claim 10, wherein said second thermosensitive layer includes a binder and a thermal solvent.

13. The thermographic substrate as claimed in claim 11, wherein said heat resistant topcoat includes a heat resistant binder, abrasive particles, and lubricants.

* * * * *